(12) United States Patent
Larson et al.

(10) Patent No.: US 6,504,841 B1
(45) Date of Patent: Jan. 7, 2003

(54) THREE-DIMENSIONAL INTERCONNECTION GEOMETRIES FOR MULTI-STAGE SWITCHING NETWORKS USING FLEXIBLE RIBBON CABLE CONNECTION BETWEEN MULTIPLE PLANES

(75) Inventors: Brian Ralph Larson, Eagan; Charles Kryzak, Mendota Heights, both of MN (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/426,466

(22) Filed: Oct. 26, 1999

Related U.S. Application Data

(63) Continuation-in-part of application No. 09/055,396, filed on Apr. 6, 1998, now Pat. No. 6,215,786.

(51) Int. Cl.⁷ .............................................. H04L 12/50
(52) U.S. Cl. ...................................... 370/386; 340/825.5
(58) Field of Search ............................. 370/386, 411, 370/372, 388–392, 395, 396, 412–416, 276, 286; 379/272, 271; 359/247, 298; 340/224; 330/269, 65

(56) References Cited

U.S. PATENT DOCUMENTS

| | | | | |
|---|---|---|---|---|
| 3,701,112 A | * | 10/1972 | Hagelbarger | 370/372 |
| 4,079,207 A | * | 3/1978 | Ueda et al. | 379/272 |
| 4,566,007 A | * | 1/1986 | Richards | 340/2.24 |
| 5,162,944 A | * | 11/1992 | Yamamoto et al. | 359/247 |
| 5,430,561 A | * | 7/1995 | Kato et al. | 359/298 |
| 6,215,786 B1 | * | 4/2001 | Larson | 370/386 |

\* cited by examiner

*Primary Examiner*—Kwang Bin Yao
*Assistant Examiner*—Prenell Jones
(74) *Attorney, Agent, or Firm*—Fuess & Davidenas

(57) ABSTRACT

Scalable Computer Interconnect (CSI) compliant multi-stage switching networks compactly electrically communicatively interconnect a large number N of electrically communicating devices, typically computers or memories, in three-dimensional space. The logic networks, including a preferred "layered network" of U.S. Pat. No. 4,833,468, are (i) rotated, (ii) folded and (iii) squared per companion U.S. Pat. No. 6,301,247 so as to assume optimal topology. The topologically-optimized switching network logic is physically realized as (i) planar panels each mounting multi-chip modules, or tiles, each having logic switchpoints each realized by switch dice, plus vias through the tiles, plus pads upon both sides of the tiles, plus connective wiring layers upon the tile, connected by (ii) multi-conductor flexible flat printed circuit cables located between the adjacent panels. System peak performance is 24 teraflops/second.

28 Claims, 30 Drawing Sheets

PRIOR ART

BASELINE
NETWORK

PRIOR ART

REVERSE BANYAN NETWORK

TWO-PLANED LAYERED NETWORK (N=32, a=2, b=2)

PRIOR ART 32-node Layered Network normal column order

|   |   |   |   |
|---|---|---|---|
| B | B | 3 | 3 |
| A | A | 2 | 2 |
| 9 | 9 | 1 | 1 |
| 8 | 8 | 0 | 0 |
| Column 5 or 4 or 3 | Column 0 or 1 or 2 | Column 5 or 4 or 3 | Column 0 or 1 or 2 |

*Fig. 7*

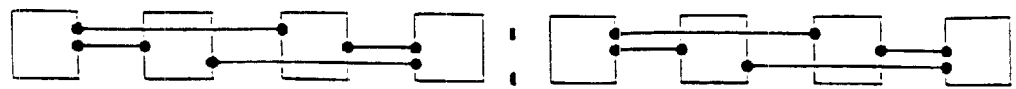
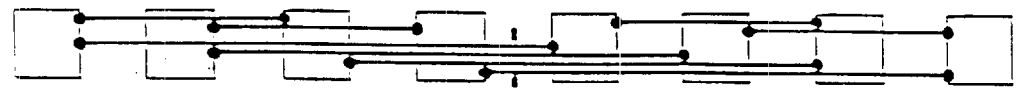
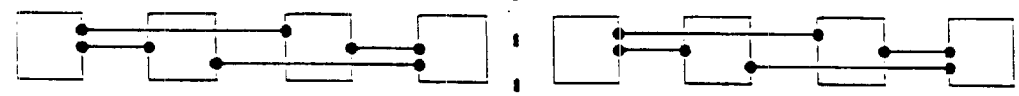
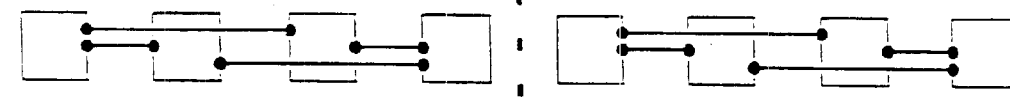
Fig. 9

SECTOR D

| 18 | 19 | 1A | 1B | 1C | 1D | 1E | 1F |
| 18 | 19 | 1A | 1B | 1C | 1D | 1E | 1F |
| 10 | 11 | 12 | 13 | 14 | 15 | 16 | 17 |
| 10 | 11 | 12 | 13 | 14 | 15 | 16 | 17 |
| 8 | 9 | A | B | C | D | E | F |
| 8 | 9 | A | B | C | D | E | F |
| 0 | 1 | 2 | 3 | 4 | 5 | 6 | 7 |
| 0 | 1 | 2 | 3 | 4 | 5 | 6 | 7 |

*Fig. 12b*

SECTOR B - ROUTING BITS (4,6) and (5,3)

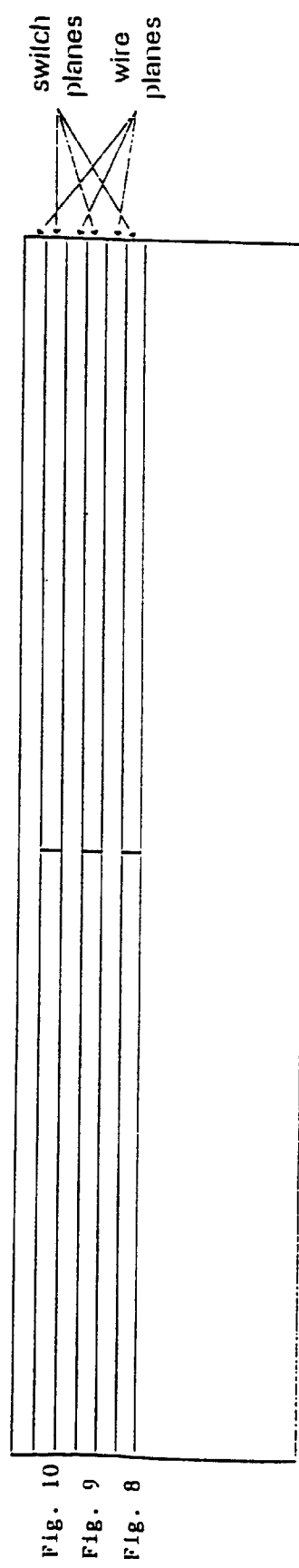

THREE-DIMENSIONAL INTERCONNECTION GEOMETRIES FOR MULTI-STAGE SWITCHING NETWORKS USING FLEXIBLE RIBBON CABLE CONNECTION BETWEEN MULTIPLE PLANES

REFERENCE TO RELATED PATENT APPLICATIONS

The present patent application is related as a continuation in part to U.S. patent application Ser. No. 09/055,396 filed on Apr. 6, 1998 for IMPLEMENTATION OF MULTI-STAGE SWITCHING NETWORKS, now issued as U.S. Pat. No. 6,215,786. The present application is also related to U.S. patent application Ser. No. 09/426,501 filed on an even date herewith for PAD AND CABLE GEOMETRIES FOR SPRING CLIP MOUNTING AND ELECTRICALLY CONNECTING FLAT FLEXIBLE MULTICONDUCTOR PRINTED CIRCUIT CABLES TO SWITCHING CHIPS ON SPACED-PARALLEL PLANAR MODULES, now issued as U.S. Pat. No. 6,301,247. Both related applications are to inventors including Brian Larson who is a co-inventor of the present application, and both are assigned to the same assignee as is the present application. The contents of the related patent applications are incorporated herein by reference.

The first related patent application for IMPLEMENTATION OF MULTI-STAGE SWITCHING NETWORKS generally concerns the design of multi-stage interconnection switching networks that provide for the exchange of data between multiple electronic devices, and more particularly concerns the logic organization and layout of semiconductor die, and the associated wiring between such die, for implementing large and very large three-dimensional multi-stage interconnection networks. The multi-stage interconnection networks so designed are characterized by (i) an efficient logical organization, (ii) a very large size that typically interconnects of the order of 4096 and more communication ports, and (iii) a sophisticated, three-dimensional, interconnection geometry.

The present application concerns the rule-directed design of three-dimensional multi-stage interconnection networks based on (i) electrical interconnection proceeding through multiple parallel wires, normally in the form of flexible ribbon cable, extending in a flat plane between (ii) multiple planes, or modules, that are preferably orthogonal to the planar interconnecting wires in which modules reside multiple standard switching chips that also constitute portions of the interconnection paths. The present application is thus related to the predecessor application as a particular methodology for realizing a three-dimensional electrical interconnection—particularly between large numbers of points at high densities as epitomizes a very large multi-stage switching, or interconnection, network. Multi-stage interconnection, or switching, networks of the present invention will be characterized by the orderly, rule-directed, co-location of a greater density of interconnection wires—normally in the form of flexible ribbon cable—laid flat and parallel, or, in regions, orthogonal, within small volumes between each of successive planes, or modules, within which reside standard interconnection routing chips, or dice. The physical geometry of such a multi-stage interconnection, or switching, network will appear dense, and complex, but regular and ordered.

The second related patent application for PAD AND CLIP GEOMETRIES FOR MOUNTING AND ELECTRICALLY CONNECTING RIBBON CABLES TO SWITCHING CHIPS IN SPACED-PARALLEL PLANAR MODULES concerns a preferred physical geometry for each of (i) a spring connector for securing flat circuit, typically flexible ribbon cable, ends in pressured contact with a substrate (of a plane, or module), in which is present (ii) a pattern of electrical pads. The electrical and mechanical connection taught within the second related patient application is characterized in that (i) flat circuits, normally in the form of flexible ribbon cables, are routed through free space substantially in each of two orthogonal planes while (ii) the points of connection to the bent ends of all such flat circuits (e.g., ribbon cables) are arrayed along diagonals in yet another, further orthogonal, plane of connection that is established by arrayed chips held in a planar module, or tile. In simple terms, the 90° bent wire ends of one flat circuit (ribbon cable) will be connected in the orthogonal plane of a module simultaneously that the 90° bent wire ends of another flat circuit (another ribbon cable)—located in another, orthogonal, plane—are connected in the plane of the same module. Although this can clearly be done when spacing is adequate, in actual implementation the flat circuits (ribbon cables) and modules will be seen to be tightly packed. This second related patent application is thus related to the present application as a preferred means for realizing a compact electrical connector/electrical connection in a three-dimensional multi-stage interconnection, or switching, network.

BACKGROUND OF THE INVENTION

1. Field of the Invention

The present invention generally concerns the design of three-dimensional multi-stage interconnection networks based on (i) many flat circuits, normally in the form of flexible ribbon cables, connecting between each of (ii) multiple planes, or modules, or tiles in which reside both standard chips and printed wiring that also constitute portions of the interconnection paths.

The present invention particularly concerns very large scale interconnection, or switching, networks that are not only logically efficient, and potentially also non-blocking, but that are, in accordance with the present invention, physically realized in structures that are each of economic, manufacturable, orderly, and maintainable because they are constructed in accordance with a rule-directed physical (inter)connection geometry. The rule-directed interconnection geometry is efficient, reliable, regular, and, arguably, elegant.

2. Description of the Prior Art

The present invention is concerned with the physical realization of multi-stage interconnection switching networks which provide for the efficient and rapid communication of data between large numbers of electronic devices, typically hundreds and even thousands of computer data processors. The multi-stage interconnection switching networks involve large numbers of semiconductor switch dice located in co-parallel planar modules which comprise the stages, and (ii) the associated electrical interconnection wiring between the planar-arrayed dice in each stage, forming thus a switching network in three dimensions.

The switching networks of the present invention are designed with switches, or switchpoints, that are located in logical rows and in logical columns, as is common. Such switching networks are commonly physically constructed with the physical switches—which are commonly implemented from semiconductor dice—arranged into physical ranks and physical files. When large numbers of electronic devices must be interconnected by even larger numbers of switches, the switches are commonly logically and physically arrayed as multiple stages. Because laying out each of the stages on the same plane soon becomes unwieldy large, each stage is laid out on a single plane, and the planes are stacked one atop another in three dimensions.

If, for smaller switching networks, all the switches, or switchpoints, are physically located in a common plane—such as on a single circuit panel or on a number of circuit panels adjacent to one another, then the interconnection wiring between the outputs and the inputs of the various switches of this circuit panel are clearly accomplished in, or substantially in, the plane of the circuit panel. When several circuit panels are used, it is common to connect from one to the next by edge connectors. The several printed circuit panels may be located in a single plane, and the edge connections may thus also be in this plane. However, if the edge connections are made with flexible cable, including the multi-conductor flexible cable commonly known as ribbon cable, as is common, then the panels may be arrayed spaced parallel to each other in a stack.

Although wiring has occasionally been made from central area regions of one panel directly across to corresponding central area regions of an adjacent parallel panel, at least two problems have beset making electrical connection directly from panel to panel in the volume between them so as to attempt to realize high density, and minimal communication delay, within a multi-stage switching network. If the interconnecting wires are permanently, or semi-permanently, affixed to the panels, such as by soldering in holes, then the successive panels must be "laid up" in order during construction, and become effectively impossible to disassemble for maintenance to replace any chip switches that have failed. If the interconnecting wires—commonly in the form of ribbon cables with stripped wire ends—are instead not to be placed through holes in the panels and soldered, then a reliable form of electrical connection, and electrical connector, is needed between the interconnecting wires and the transverse panels. Moreover, even if a suitable connector is found, the typically high wiring density between the panels tends to turn the volume between the panels into a "rat's nest", with physical conflicts between wires forcing the panels to greater separation and the interconnection wires to greater lengths, and to associated communications signal delay, than would desirably be the case.

These problems have heretofore been so severe that free-space optical interconnections have been contemplated between panels of a stack for appreciably-sized multi-level switching network cross-connecting 256 nodes or more. Photons, being a type of boson, pass though each other in free space without appreciable cross-interference, and have thus been hypothesized to be more suitable for three-dimensional spatial-point to spatial-point communicative interconnection than would be electrons, which, as fermions, strongly interfere with each other—whether or not carried on wires which themselves exhibit spatial impermeability. Although there may yet be a point where three-dimensional optical interconnection, with all its overhead of transformation from and to the electrical signals presently used for computation and switching, becomes useful or even dominant, the present invention will be seen to concern good "old fashioned" point-to-point wiring, extending such wiring into multi-level networks of sizes heretofore believed impracticable, if not impossible, of being implemented by purely electrical connection.

The present invention will shortly been seen to contemplate a truly three-dimensional switching network where communication connections are made in the volume between adjacent parallel circuit panels, and along routes between the panels which routes are transverse to the planes of the panels. In accordance with the present invention, the wiring between adjacent panels, although extremely dense and spatially sophisticated, is highly regular, and substantially devoid of conflicts. In accordance with the second related invention, regular and reliable electrical connection may be made from the flat wiring circuits, or flexible ribbon cables, located between adjacent panels and in plane transverse to the panels. Switching circuits are located in electrical dice upon, and co-planar with, the panels.

The three-dimensional switching network physical geometries of the present invention are suitable to implement diverse logical switching networks. The prior art baseline network of FIG. 1, the reverse Banyan network of FIG. 2, the Cantor network of FIG. 3, the two-planed layered network of FIG. 4, or any of the other layered networks that are described in U.S. Pat. No. 4,833,468, which is entitled LAYERED NETWORK and which issued in the names of selected inventors of the present invention on May 23, 1989, are all examples of networks which may beneficially use the three-dimensional interconnection geometries of present invention.

However, the preferred wiring rules, patterns and topology of the present invention—i.e. the locations of the interconnection wires between the panel-mounted switches—are based upon the logic switch design taught within the first related patent application. The logic design of the switch is not difficult to understand. Why, however, one particular logic design should be selected from among many competing candidates—so as to make realizable an efficient physical geometry—will become increasingly clear in the present disclosure.

The invention of the related patent calls for a (i) rotating, (ii) folding and (iii) squaring process on a logical network. This (i)–(iii) process substantially reduces the length of (wired) connections between, as ultimately physically laid out, the physical switches within the physical network. In other words, the logical network is selectively "preconditioned" by moving the logical switching elements around (totally without change to the logical function of these elements, nor of the multi-level switching network that they serve to implement) so as to make more efficient—even possible—the (wired) implementation of the physical switching network which is the concern of the present invention.

Moreover, the approach of the related invention will be seen to permit the construction of very large networks by combining smaller networks. In networks constructed with the rule-directed geometries of the present invention, the length of the longest connections between switches will be found to be proportional to the square root of the number of ports provided by the network.

Furthermore, once the power of this approach (i.e., "preconditioning" a logical multi-stage switching network so as to then best permit subsequently physically realizing a real-world multi-stage switching network by the rule directed geometries of the present invention) is fully understood, it will be realized that the approach is of general applicability to implementing multi-stage switching networks.

In particular, the layered network of the U.S. Pat. No. 4,833,468 has, as a design, a number of desirable features. However, the layered network design of this patent was initially implemented in accordance with precise algorithms so that each network load size required a unique wiring topology and various different kinds of switching panels. The present invention will show how to physically implement, by way of example, a layered network in a regular, scalable, form. In other words, the same parts may be used to build very large, and stupendously large, switching networks as are used to build large switching networks. Although a layered network from the former patent is used as an example to illustrate the present and related inventions, the present invention may be applied to the various other types of multi-stage switching networks, including (i) baseline, (ii) Banyan and (iii) Cantor networks, (iv) all the layered networks that may be constructed in accordance with the teachings of U.S. Pat. No. 4,833,468, and (v) still other types of switching networks including those of the above-referenced related patent applications.

SUMMARY OF THE INVENTION

The present invention contemplates a particular physical realization of multi-stage three-dimensional switching networks, especially as may be implemented at large and very large scale, for electrically communicatively interconnecting large numbers of electrically communicating devices, normally hundreds and thousands of such devices. The physical realization transpires by use of (i) multi-conductor flat circuits, normally in the form of flexible ribbon cable, to connect (ii) multiple planar panels, or modules, or tiles, in each of which resides both some number of standard switching chips, and printed wiring between the chips, that also constitute a portion of the interconnection paths.

The (ii) panels, or modules, or tiles and their contained printed circuit wiring and switching chips are the "layers" of a logical multi-layer switching network. (Actually two network switch layers—logically separated yet!—are sometimes within the same panel.) The (i) multi-conductor flat circuits, or ribbon cable, form the electrical connection between the "layers" of the logical multi-layer switching network.

Thus the physical multi-layer switching network includes (a) a number of spaced-parallel planar panels electrically interconnected by (b) substantially-planar multi-conductor circuits, or cables, in three-dimensional space. More particularly, a plurality N1 of the (a) spaced-parallel planar panels are stacked from a bottom panel (a "layer" of the logical switching network) that is located physically closest to the devices communicatively interconnected by the switching network to a top panel (another "layer" of the logical switching network) that is located at the furthest distance from the communicatively interconnected devices. Already this geometry is somewhat strange: it represents a logical switching network that has been folded. Namely, signals originating from communicatively interconnected devices go out onto the switching network at a nearest panel and, after transiting panel-to-panel all the way to the most distant panel, then wrap back through the same stacked panels until reaching their destinations among (typically different ones of) the same devices. The signals are normally self-routing, with all necessary switching and routing information being carried in the signal.

Each (a) spaced-parallel planar panel mounts (a1) a number N2 of multi-chip modules known as tiles. Each tile has (a1a) a number N3 of switchpoints. Each of the switchpoints is realized as (a1a1) a number N4 of dice, having pads and held to the tiles, for switching received electrical signals, (a1a2) a number of electrically conductive vias through the tiles, (a1a3) a number of N5 of electrically conductive pads upon both sides of the tiles, and (a1a4) wiring layers upon the tile electrically connecting the dice pads, the vias, and the electrically conductive pads. The electrically-connectable pads are presented upon both sides of the tiles, and of the panels in which the tiles are mounted.

The (b) flexible substantially-planar multi-conductor cables are located between adjacent panels. These cables serve to electrically connect the pads on one panel to the pads of a facing surface of an adjacent panel. These cables make a number N6 of flex connections total.

So far the construction—while certainly specific in the described (a) planar panels, (a1) multi-chip modules, or tiles, (a1a) switchpoints, (a1a1) dice, (a1a2) vias, (a1a3) electrically conductive pads, and (a1a4) wiring layers—has been somewhat arbitrary. In other words, if a three-dimensional multi-level switching network was to be contemplated in the first instance, it might reasonably be assumed that things like panels and switches and cables would need be connected together, or necessity, in some kind of structure, and in some kind of order. However, herein next lies a unique characteristic of the three-dimensional multi-stage switching network in accordance with the present invention: the (b) substantially-planar multi-conductor cables are aligned in their extension between the (a) spaced parallel planar panels very substantially in but two sets of parallel planes, the planes of each which set are orthogonal to the planes of the other. Both the two sets of planes are also orthogonal to the planes of the panels, which constitute a third set of planes.

These orthogonal planes in which planar multi-conductor, or ribbon, cables are routed will prove to be readily visibly detectable in the drawings. The reason that this orthogonal routing is significant is that "flexible cable" can twist and turn every which way—exactly as it is most often called upon to do. But consider the quite opposite, and rigid, geometry of the present invention: all the electrically conductive interconnections—whether wires in cables or printed circuit wiring traces on rigid panels—reside in some particular plane in one of three sets of orthogonal planes. The cables between the panels are located in very substantially in but two sets of spaced-parallel planes. The planes of each set are orthogonal to the planes of the other set. The panels occupy a third set of spaced-parallel planes. The planes of this third set are orthogonal to all the planes of both of the other two sets. Roughly speaking, everything is "square" to everything else, and so appears. For this reason, the common name of a multi-level switching network constructed in accordance with the present and related inventions is a "four square network", and the network will be so called in the present application.

In further detail, the planar panels preferably include channels within which coolant flows for removal of heat developed in the (physical) dice (containing the logic switchpoints) upon the tiles that are mounted to the panels. Because the electronic dice consume power, the planar panels normally further include power and ground connections to the tiles on which reside the dice.

Considerably more arbitrarily, each of the multi-chip modules known as tiles preferably has and defines recesses in which are located the several dice that serve to realize a number of logic switchpoints. The preferred mounting of the dice is recessed so that one surface of each dice is substantially even with a surface of the tile, thereupon permitting that wiring upon the tile may be implemented as printed circuit traces substantially in a single plane upon the exposed surfaces of both the tiles and the dice.

The flexible substantially planar multi-conductor cable preferably consists of ribbon cable with stripped wire ends bent ninety degrees so that these wire ends may lie flush against the pads of the panels. The preferred ribbon cable is treated, commonly by heat, at its stripped ends so as to become rigid.

However, and in full accordance with the dictate of the present invention that these cables should lie strictly in two sets of (orthogonal) planes, the cables may alternatively be implemented as rigid circuits. Rigidity in the area of the panel-interconnecting cables is normally neither required nor desired. However, if a (physical) multi-layer switching network of the present invention must be made rigidly strong, such as for being launched into space, it may readily be so made.

Connectors of a unique design forcibly pressure the stripped wire ends of the preferred ribbon cables against the pads of the panels so as to make electrical connection thereto. The pads on the panels are preferably located in a pattern that is identical upon both sides of the panels. The connection of (the stripped, bent) wire ends of each ribbon cable is preferably at a series of pads arrayed along a line that is—quite curiously relative to both (i) the normal layout of pad connections to electronic devices, and (ii) the prevailing square geometry of the present three-dimensional multi-stage switching network—at a diagonal to the sides of the panel.

The multi-stage switching may be built by way of example, with switchpoints that are 3×3, meaning that three signals in are selectively controllably routed to three signals out. In such a case, and in accordance with the expandability of the scheme of the present invention, many different sizes and configurations of the three-dimensional multi-stage switching network in accordance with the present invention are possible. Three such sizes and configurations are given in the following table.

| | | | |
|---|---|---|---|
| devices communicatively interconnected | 256 | 1024 | 4096 |
| Number N1 of planar panels | 4 | 4 | 6 |
| number of multi-chip modules, called tiles, each panel | 16 | 16 | 256 |
| network total tiles | 64 | 64 | 1536 |
| number N3 of 3 × 3 switchpoints each tile | 16 | 16 | 16 |
| network total switchpoints | 1024 | 1024 | 24576 |
| network total number N4 of dice (at ½ die each switchpoint) | 516 | 516 | 12288 |
| number N5 of electrically conductive pads upon each of tile side | 16 | 16 | 16 |
| number N6 of flex connections numbers per each dual-switchpoint die | 4 | 4 | 4 |
| network total number of flex connections | 2064 | 2064 | 49152 |

Note that the number of electrically conductive pads numbers 16, or the same as the number of switchpoints, upon each of the two sides of the tiles.

There may optionally be an additional direct, electrical connection, preferably still via a multi-conductor cable, between each tile and a facing tile upon an adjacent panel. In that case the number N6 of flex connections increases to 2064+64=2128 in total for the cases of both the 256-device and of the 1024-device communicatively-interconnecting multi-stage switching-device networks, and to 49152+ 1536=50688 in total for the 4096 device communicatively-interconnecting multi-stage switching network.

In each of the configurations, a panel is preferably 64 inches or less on each side, and the space between adjacent panels is preferably 4 inches or less. Accordingly, the longest flex connection between any two adjacent panels that is made by any of the flexible substantially planar multi-conductor cables is no more than 38 inches, or one half a panel's 64 inch dimension plus the 4 inch distance between adjacent panels.

As previously mentioned, the switchpoints are preferably self-routing, meaning that the connection of electrical signals from switchpoint input to switchpoint output is determined by data received at the switchpoint input.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, the various advantages of the invention will be best understood by reference to the following detailed description of the invention and the accompanying drawings wherein:

FIGS. 5a, 5b, 5c and 5d show a block diagram of a two-layered, 32-node network of the type shown in FIG. 4;

FIGS. 6a, 6b, 6c and 6d show a block diagram of the two layered, 32-node network of FIGS. 5a–5d in which the column rotation of the related invention has been applied;

FIG. 7 is a printed circuit board layout of switches which shows how the switches of two columns, such as the columns 0,5 or the columns 1,4, or the columns 2,3, may be arranged and how the switches corresponding to these paired columns may be numbered;

FIGS. 8, 9 and 10 are cards from the implementations of FIGS. 6a–6d so that the switches on each of these cards are arranged in groups A, B, C and D in which FIG. 8 applies to the switches of columns 0 and 5; FIG. 9 applies to the switches of columns 1 and 4; and FIG. 10 applies to the switches of columns 2 and 3;

FIGS. 12a, 12b, 12c and 12d are arranged relative to each other;

FIGS. 12a, 12b, 12c and 12d are a block diagram of the eight-column network represented at the bottom of FIG. 11, which shows how the switches of four card sections of the type shown in FIGS. 6a–6d may be combined to provide a 256-switch network;

FIGS. 13a, 13b, 13c and 13d are wiring patterns for the four-card arrangement of FIGS. 12a–12d;

FIGS. 14a and 14b show the wiring for the sectors A–D of the upper columns 3, 4.

FIG. 16 shows an edge view of a "four-square" network in accordance with the present invention, which edge view shows a three-switch plane stock separated by three wire planes.

DESCRIPTION OF THE PREFERRED EMBODIMENT

Although specific embodiments of the present invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. The Basis of the Multi-Level Switching Network, and the Techniques for Constructing a Multi-Level Switching Network, of the Present Invention in a Particular Adaptation and Configuration of a Logical Multi-Level Switching Network The preferred wiring rules, patterns and topology of the present invention—i.e., the physical locations of the interconnection wires between panel-mounted switches which also have prescribed locations—will work—because of their scalability—to realize an infinite combination of physical networks from an infinite combination of logical networks. However, these preferred wiring rules, patterns and topology of the present invention will not work for every logical switching network at a time before these logical switching networks are properly conformed and adapted, or "pre-conditioned". What this means will shortly be explained.

Figure 1:
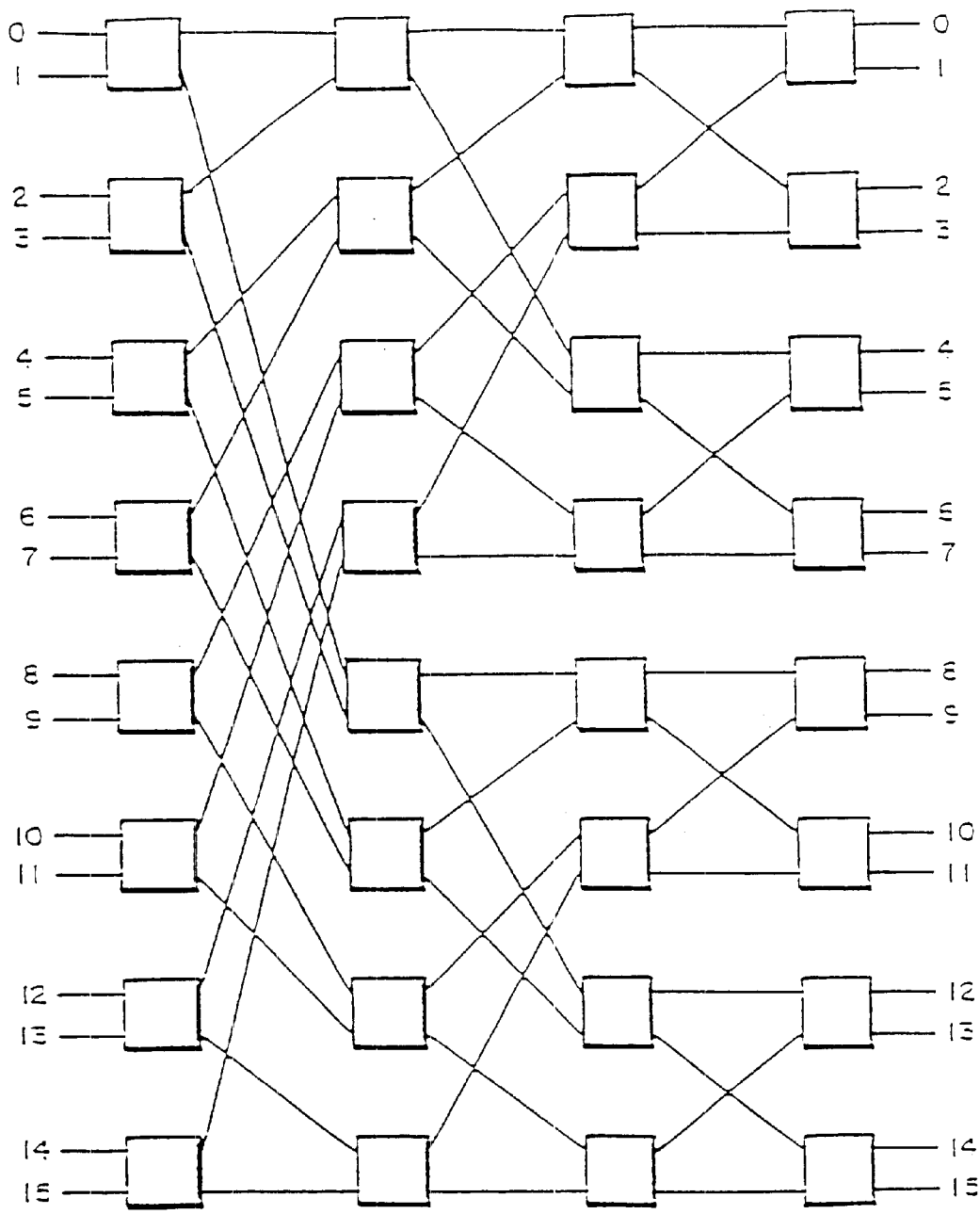
FIG. 1 is a block diagram of a prior art baseline network.
Figure 2:
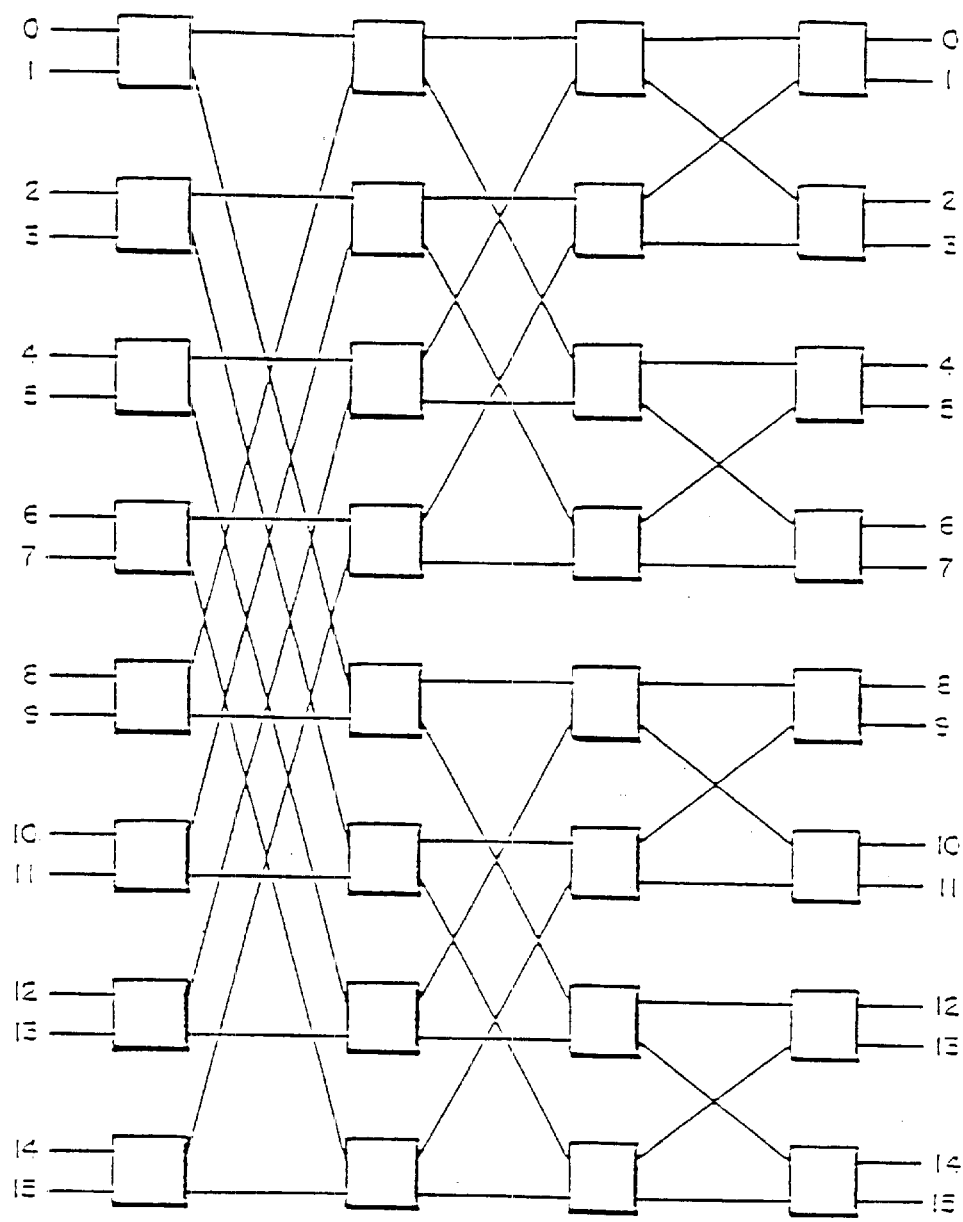
FIG. 2 is a block diagram of a prior art reverse Banyan network.

Suitable logical multi-level switching networks are possessed of an even number of logical columns, greater than four, by an even number of rows, greater than two, of switches. In other words, the minimum dimension of the switching network is six columns by four rows of switches. Types of switching networks of this scale, and larger (and much larger) that are non-blocking include the prior art baseline network of FIG. 1, the prior art reverse Banyan network of FIG. 2, the prior art Cantor network of FIG. 3, the prior art two-planed layered network of FIG. 4, or any of the other layered networks that are described in U.S. Pat. No. 4,833,468, which is entitled LAYERED NETWORK and which issued on May 23, 1989. Of all these networks, the "layered network" is used, by way of example, as the basis of the multi-layer switching network, and switch, or the present invention.

Next, the chosen network, must be properly conformed and adapted, or "pre-conditioned". The "pre-conditioning" in no respect changes the logic, or function, of the network. The network remains a Banyon network, a Cantor network, a two-planed layered network, or other type network—although it may possibly become slightly more difficult to recognize. (Arguably if the previous logic representations of the Banyon, Cantor and other switching networks was already in "best laid-out form" in accordance with the present invention, then the variant layout forms that these networks exhibit in the previous drawings would be "difficult to recognize". It is a conundrum why the logical network layout that is most visually appealing to the eye does not correspond to with that physical layout, at least in multiple layers, of the same network that is also most appealing to the eye (i.e., the orderly layout of the present invention), and vice versa.)

The reason that the network remains logically the same, while possibly becoming "slightly more difficult to recognize", is that it undergoes transformations, or realignment of parts, that are without consequence to the logic organization and function of the network. These transformations, or realignments, are of the nature, of (i) a rotating, (ii) a folding and (iii) a squaring process as are taught within an aforementioned related patent application. The reason for applying three transformations, or realignments, on and to the logic network is to substantially reduce the length of (wired) connections between, as this network will ultimately physically be laid out, the physical switches within the physical network. In other words, the logic network is being "pre-conditioned" only by moving its logic switching elements around, and totally without changing to the logic function of these elements, nor of the multi-level switching network that they serve to implement.

It will later be taught within this specification that the rows and the columns of switches in the logic switching network must be mapped onto (i) the planar modules, (ii) the tiles, and (iii) the files and ranks of switch dice, in physically implementing logical network. Since there is a mapping between the logical network and the physical network in any case, it is theoretically possible to dispense with talk of "pre-conditioning" the logical network, and to simply build the "rotate", "fold" and "square" rules by which the logical network is pre-conditioned into the successor rules for the organization and the layout of the physical switching network. However, these later rules are complex, and its thus taught within this specification only how a non-blocking multi-level switching network of a proper, rule-based, laid-our form can be physically reduced or an orderly, orthogonal, assemblage of (i) flat circuit, or ribbon cable, connecting (ii) multiple planar modules, or tiles, in which reside switches.

Therefore, the first related invention and patent application deals with a purported, or supposed, pre-conditioning of the logical network—nonetheless that such a "pre-conditioning" can be understood by the practitioner of the digital switching architecture design acts to be of the nature of an abstract fiction, or an intermediary product, on the path leading to the final product which is the physical multi-level switching network of the present invention. Because it is useful to have a good grasp of this intermediary, pre-conditioned, logical switching network before entering into the final construction of the physical multi-level switching networks of the present invention, the disclosure of the related application is next substantially paraphrased in the remainder of this section 1. The construction of a preferred physical multi-level switching network of the present invention will be taught in section 2.

1.1. Adaptation, or Revised Layout, or "Pre-Conditioning" of the Logic of Multi-Layer Switching Networks In Accordance With the Related Invention to Prepare These Networks for Physical Implementation in Accordance With the Present Invention In accordance with the first related invention, and patent application, the use of certain techniques permits the logical layout of multi-stage switching networks to become susceptible, by use of further techniques of the present and of a second related invention, of being physically implemented within compact volumes. Moreover, the logic network layout so manipulated can be both logically and physically expanded from small to very large size networks.

A transformation of the abstract topology design of the logical network to a design suitable to assume a physical geometry uses the three steps of "rotate", "fold" and "square". The basic switching network layout is first designed. The layout has an even number, greater than four, of columns by an even number, greater than two, of rows of switches.

This layout is then rotated end-around so that the two columns of switches of the module that require the longest wires are located at the middle of the module.

The rotated module layout is next conceptually folded in the middle so that columns equidistant from the center are placed together.

Finally, the switches are then arranged into a regular or square, configuration so that for each switch in the configuration, every other switch whose row number differs by a single bit is located directly above-or-below, or directly to the left-or-right, of such switch.

When all the switches are arranged in a pattern like this, all wiring between switches is straight and short. The length of the longest wire grows proportionally to the square root of the number of connections made by the network, and not linearly with the number of connections as in the prior art.

The geometry of the related and the present inventions scales to larger networks by combining four smaller networks and adding an additional rectangular panel of switches and wiring for the additional panel (only). Arbitrarily large networks may be built this way.

In accordance with what will be further discussed in section 2, hereinafter, the wiring between panels may be on rectangular multi-layer printed circuits, or on thin ribbons of flexible circuitry. Both rectangular and ribbon wiring geometries may be used in a single network depending on distance between switches to be connected and other considerations. Finally, the networks need not necessarily be square in shape. The switches may be configured into other shapes, including parallelograms, without losing the advantageous properties of the present and related inventions.

The principles of multi-level switching network construction may be applied to construct multi-stage networks, ranging from small to large networks, all of which use the same type of switch. In addition, the construction of the networks in accordance of the principles of construction provides a number of advantages related to switch and wiring geometry.

The networks constructed with the present and related inventions are named "four-square" to describe the way larger networks are made from smaller ones. The term "square" is used illustratively and is not intended to limit the physical embodiment to a square shape.

Figure 4:
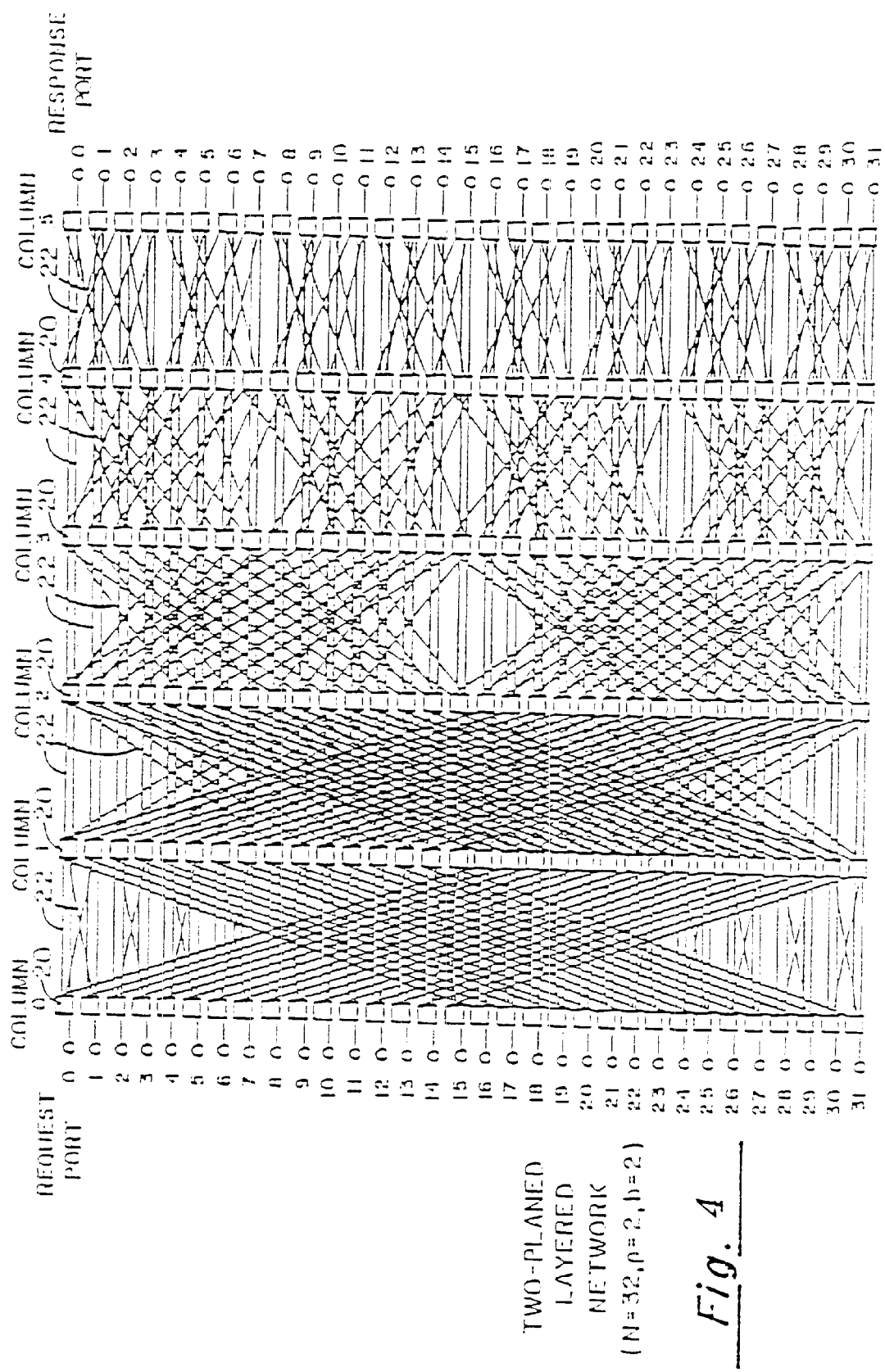
FIG. 4 is a block diagram of a prior art two-layered network.

The present invention may be used to implement a logical switching network in accordance with U.S. Pat. No. 4,833,468, as is shown in FIG. 4, as a representative example so as to illustrate the manner by which multi-stage switching networks are configured and constructed. Aside from being one of the types of networks to which the present and related invention may be applied, the wiring topology and operation of the network of U.S. Pat. No. 4,833,468 are not essential to the present and related inventions. U.S. Pat. No. 4,833,468 only serves to illustrate one of the many wiring topologies to which the present and related inventions apply.

FIG. 4 shows a two-planed layered network, implemented in accordance with U.S. Pat. No. 4,833,468, that has six columns of switches, numbered 0–5, and 32 rows, numbered 0–31. At the input of each of the rows there is a numbered request port, and at the output of each of the rows there is a numbered response port. Point-to-point connections between the request port and the response port are made through the network upon the interconnecting wire pattern, as is shown in FIG. 4.

The signals that are directed from the request port are called "requests," and they travel through the network until they reach a device connected to a selected one of the response ports. The response port then sends a "response" signal containing requested data back through the network to the request port. The switches in the network are active switches, and switch settings are determined by comparing origin and destination information that is within each request with the request's current location in the network. Each switch routes the request using only information that was contained in the request itself, thereby providing a distributed routing without a centralized controller. Each switch remembers its setting so as to route responses along the same paths as the associated requests, but in the reverse direction.

In the layered networks of U.S. Pat. No. 4,833,468, a switch can route a signal to another switch in the next stage that has the same switch number except for a single binary digit. A "request" (packet) contains a binary number that identifies the desired response port. Each switch compares the request's destination with selected binary bits in its own switch number, and if the bits compared are the same, then the request is routed along a straight interconnection path to a next switch of the same row in the next column. Otherwise, the request is routed to a switch of another row in the next column through one of the "diagonal" connecting paths. This comparison reduces to one the Hamming distance (i.e., the number of bits of the address that differ) between a packet's destination address and the row number of the switch it currently occupies. If the request reaches the switching output stage and the switch number exactly matches the request, then the Hamming distance will be zero.

The connections between the output terminals of one column of switches and the input terminals of the next column of switches are interconnected in accordance with selected row address routing bits. The algorithm for implementing an embodiment of a layered network of the type described in U.S. Pat. No. 4,833,468 depends upon the input and output terminals that are associated with each of the switches and the numbered switches in a selected algorithm base.

The particular layered network shown in FIGS. 5a–5d is a two-planed layered network that has thirty-two rows and two planes and is an enlarged version of a network that is similar to that of FIG. 4. This means that the interconnection wires throughout the network from the output terminals of the switches of column 0 to the input terminals of the switches of column 5 have two straight paths and two diagonal paths for each of the switches of the network.

FIGS. 5a–5d shows that the longest wires of this network embodiment occur between the switches of columns 0 and 1 and between those of columns 1 and 2. The first step in implementing the present and related invention in networks, such as the one in FIGS. 5a–5d in which the longest interconnecting wires are not found in the middle of the network, is to conceptually or graphically "rotate" the columns of the network.

After column "rotation" it is seen that the interconnection pattern that existed in FIGS. 5a–5d between columns 4 and 5 now appears between columns 0 and 1. The interconnection pattern between the outputs of the switches of column 1 and the inputs of the switches of column 2 is then identical to the prior interconnection pattern between the outputs of the switches to the inputs of the switches of column 1 in FIGS. 5a–5d. Thus, it is seen that all of the interconnection patterns are moved to the right by column so that the interconnection pattern of FIGS. 5a–5d between the switches of columns 1 and 2 with the longest interconnection paths is now placed between the switches of columns 2 and 3 in the middle of the network of FIGS. 6a–6d.

The row address routing bits then are used to determine the wiring pattern between the switches of the layered network of FIGS. 6a–6d are shown below the wires and between the columns of the switches. For example, between columns 0 and 1 row routing address bits 0,1 are used. Between columns 1 and 2 the row routing address bits 0,4 are used. Between columns 2 and 3 the row address bits 4, 3 are employed. Between columns 3 and 4 the row address bits 3,2 are used. Between columns 4 and 5, the row address bits 2,1 are used.

In the network of FIGS. 6a–6d each switch has four outputs and four inputs. The switches are numbered in hexadecimal as a compact representation of binary numbers. Two straight paths are connected between switches in adjacent columns that have the same row numbers. The diagonal paths are determined by a particular bit in the row number of the originating switch to find the row number of the destination switch.

For example, wiring the diagonal path from the switch in row 0, column 0 (upper left-hand switch in FIGS. 6a–6d) to the switch in row 2, column 1 is determined by row address bit 1 (i.e., the switch in column 0, row 0 is connected to the switch in column 1 row (0+2)=row 2). Wiring the other diagonal path is determined by bit 0 to connect to the switch in column 1, row (0+2$^0$)=row 1. (Binary non-negative integer numbers have their bits from right to left starting with zero.) Similarly, the switch in column 3 row 7 is connected to switches in column 4, row 7 (two straight paths), row (7+2$^3$)=row 5, and row (7−2$^2$)=row 3.

The interconnection pattern of FIGS. 6a–6d is now conceptually or graphically folded at the middle of the network along the dotted line between the switch columns 2 and 3. Performing this operation results in two overlapping layers of switches. The switches of columns 0–2 may be thought of as forming an upper layer and those of columns 3–5 as forming a lower layer such that after folding switches in overlapping columns will be located on the same panel. Switches to the left of the dotted line on FIGS. 6a and 6c before folding are then representative of switches on the upper layer that send requests "away" from the processors connected to the left-hand, input side, and switches to the right of dotted fold line on FIGS. 6a and 6b then represent switches on the lower level that send requests "back" towards the processors connected to the right-hand, output side of the structure. In other words, all of the switches of columns 0–2 to the left of the dotted line will lie in one layer directly over the switches of columns 3–5 to the right of the dotted line.

Folding solves the network end-around problem since it puts the longest wires on the new "top plane." Generally a processor needs to connect to both sides of the network. This is the case when a unidirectional SCI ring protocol SCI is emulated. If the processors are plugged into one side of the network, then channels emerging from the opposite side of the network previously needed to loop the end around in a most inelegant manner. In foursquare geometry, data packets traverse half the network "away" from the processors, and the other half "back." Because of this two columns of switch-points must reside on the same tile, and four different routing grids are needed for flex connections between panels. Routing grids can route in a first direction (e.g., north/south or in a second normal direction (e.g., east/west). Thus, the wires between switch terminals whose row numbers differ by a single bit are independent of whatever direction a bit is wired in the other routing grid. Two columns of wiring route two address bits each, using four routing grids.

Figure 6:
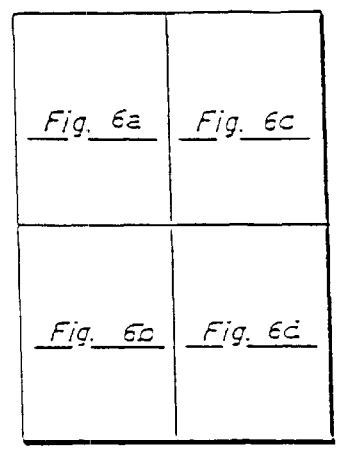
FIG. 6 is a layout that shows how
Figure 12:
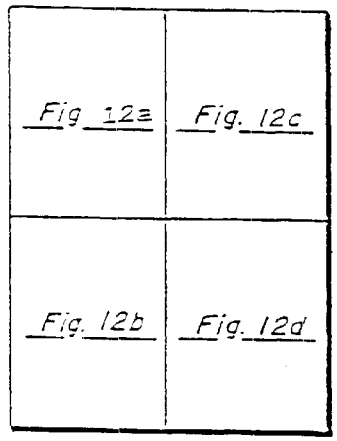
FIG. 12 is a layout that shows how
Figure 13:
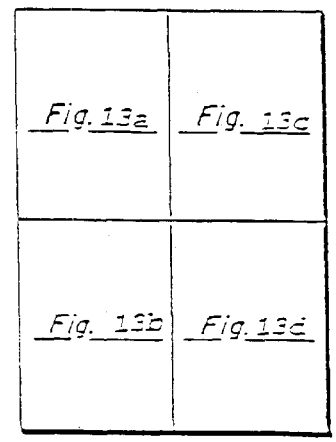
FIG. 13 is a layout that shows how
Figure 14:
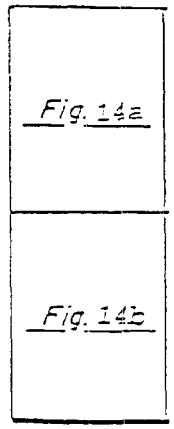
FIG. 14 is a layout that shows how
Figure 5A:
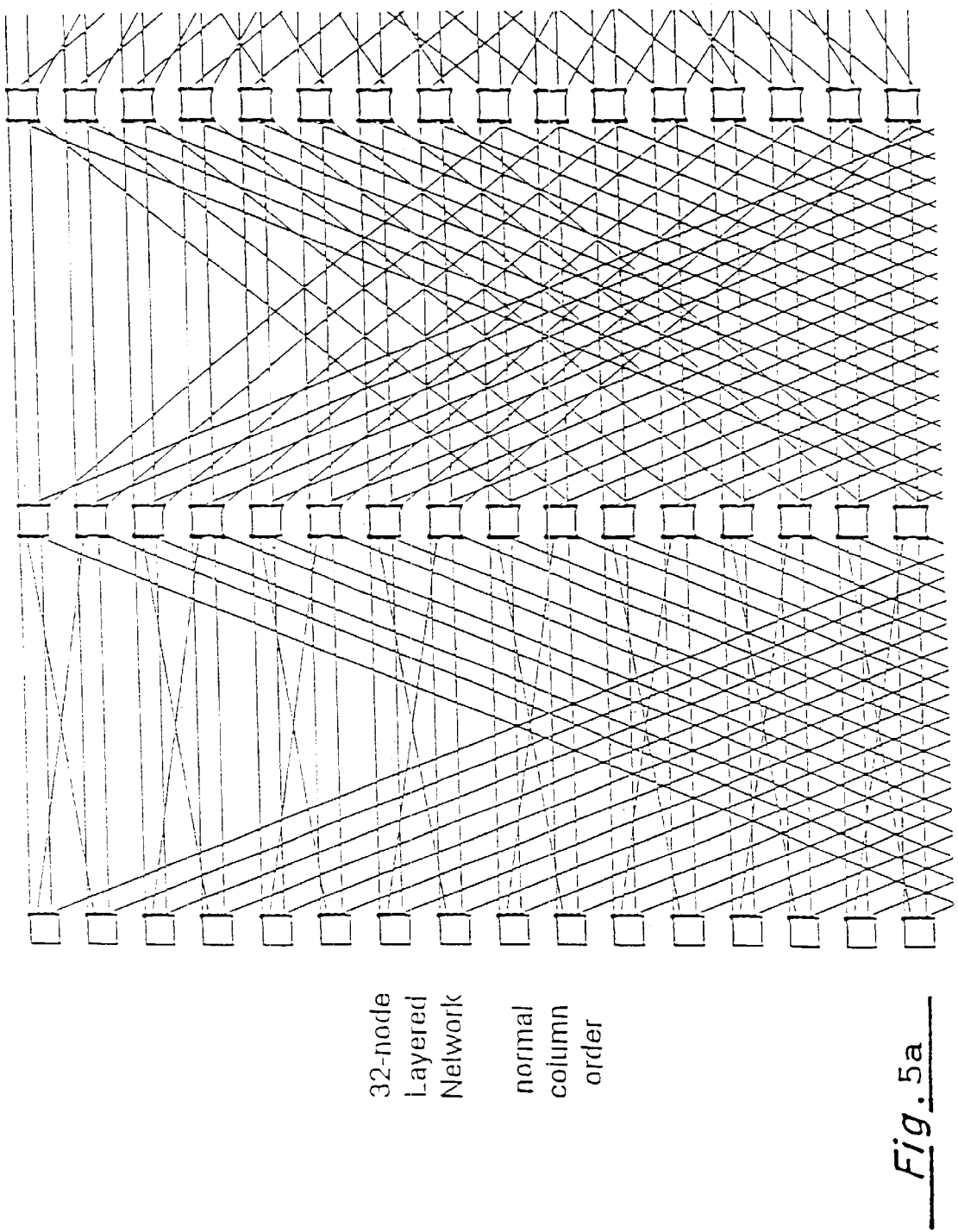
FIGS. 5a, 5b, 5c and 5d are arranged relative to each other.
Figure 5B:
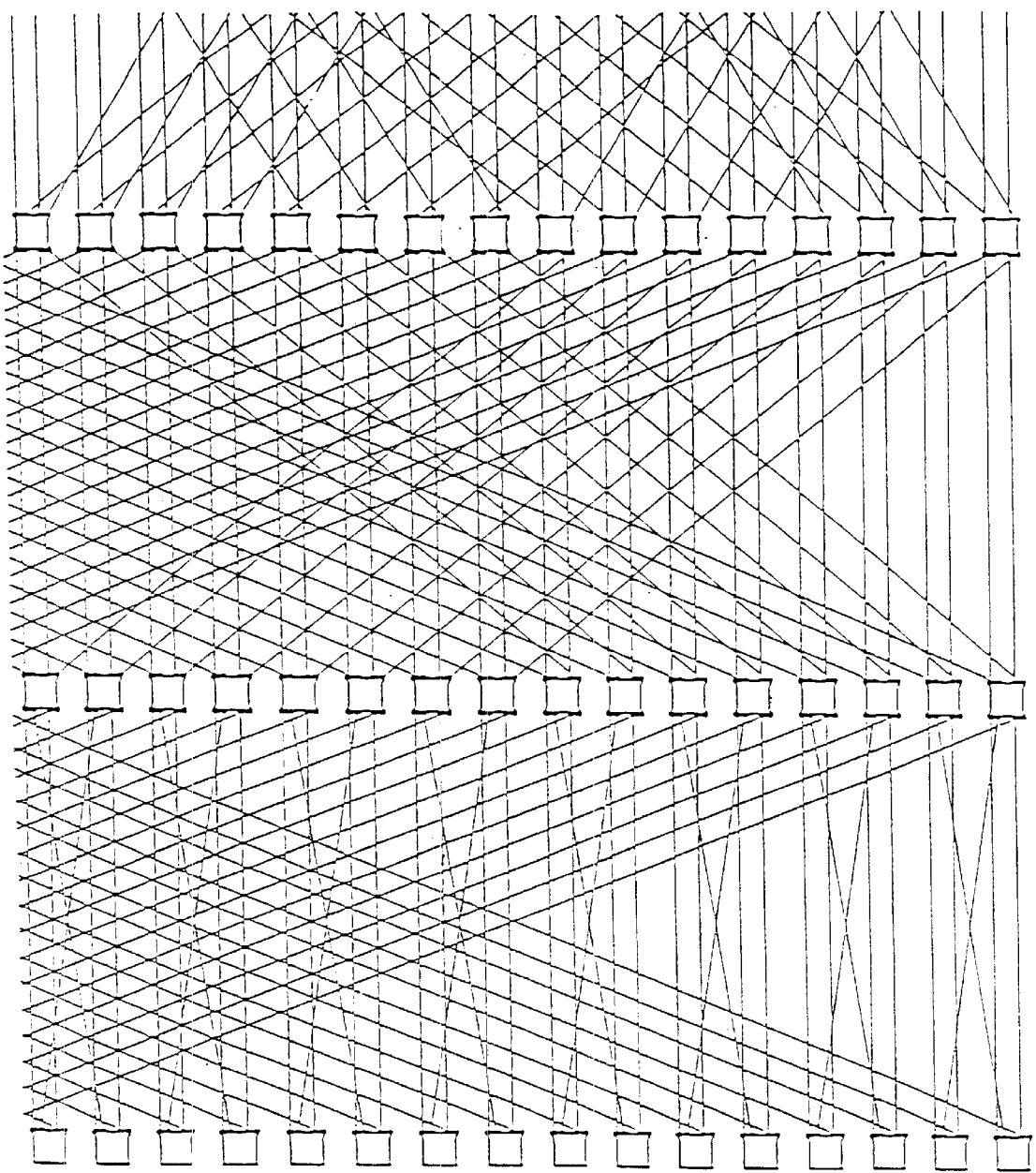
Figure 5C:
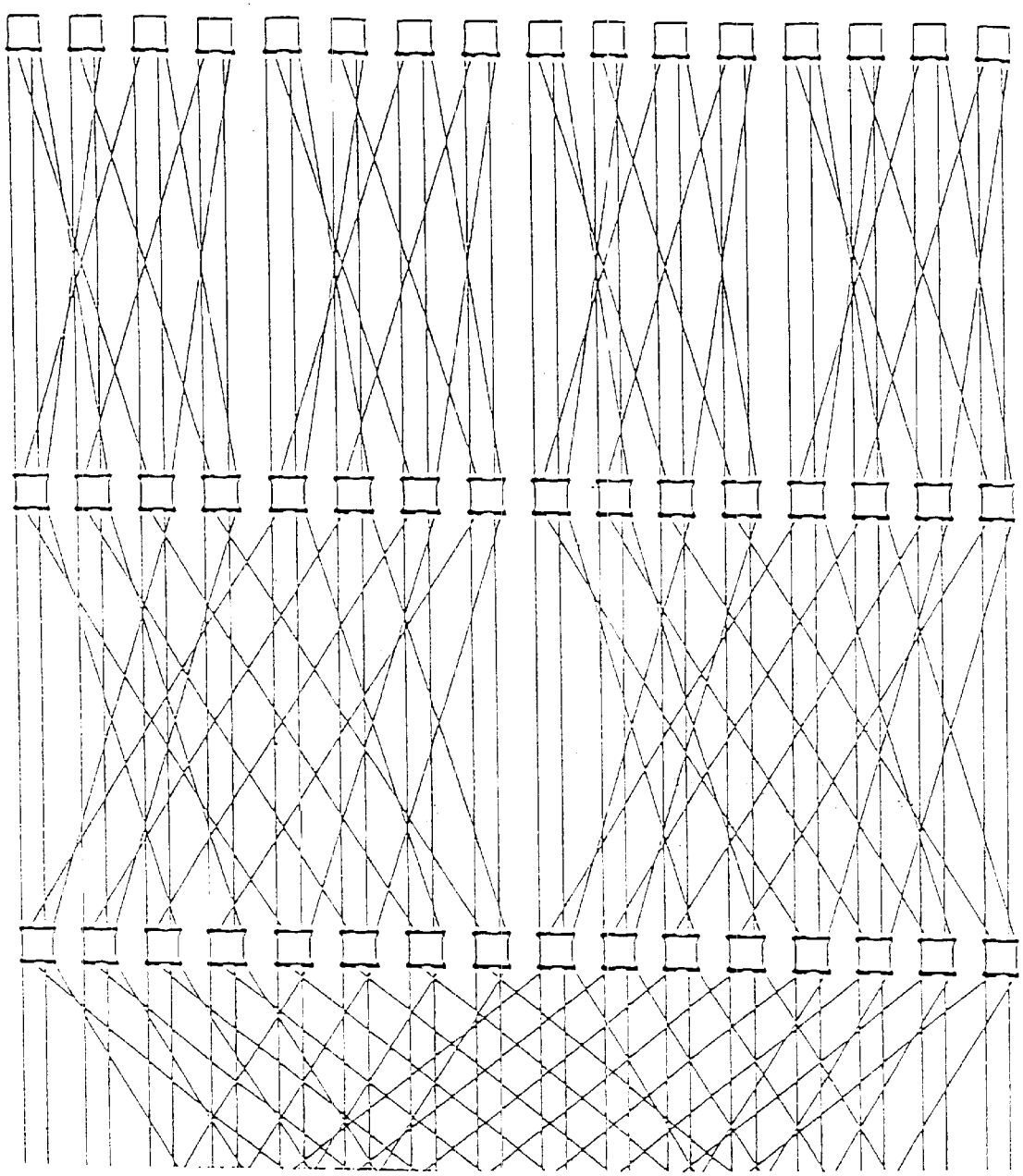
Figure 5D:
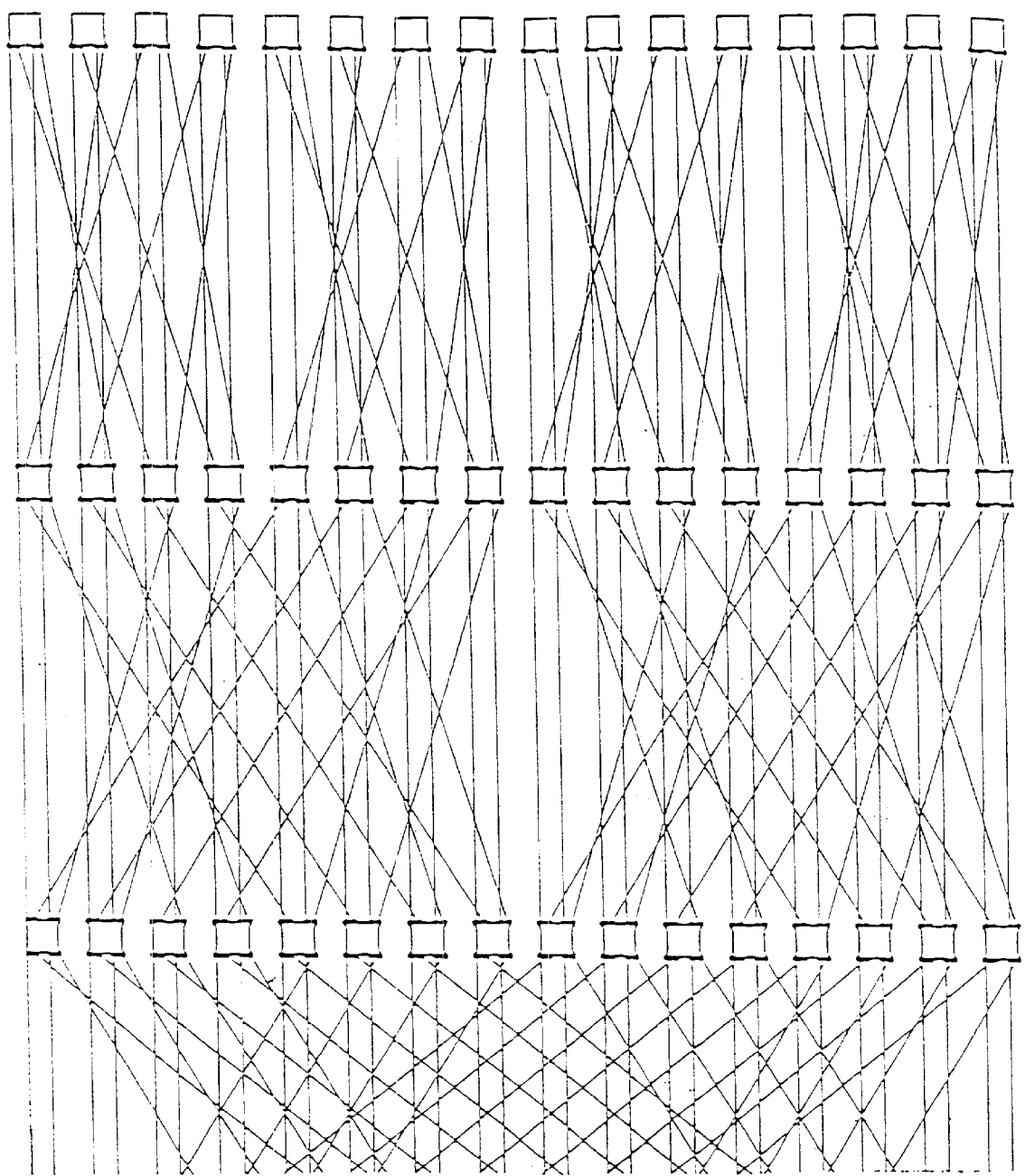
Figure 6A:
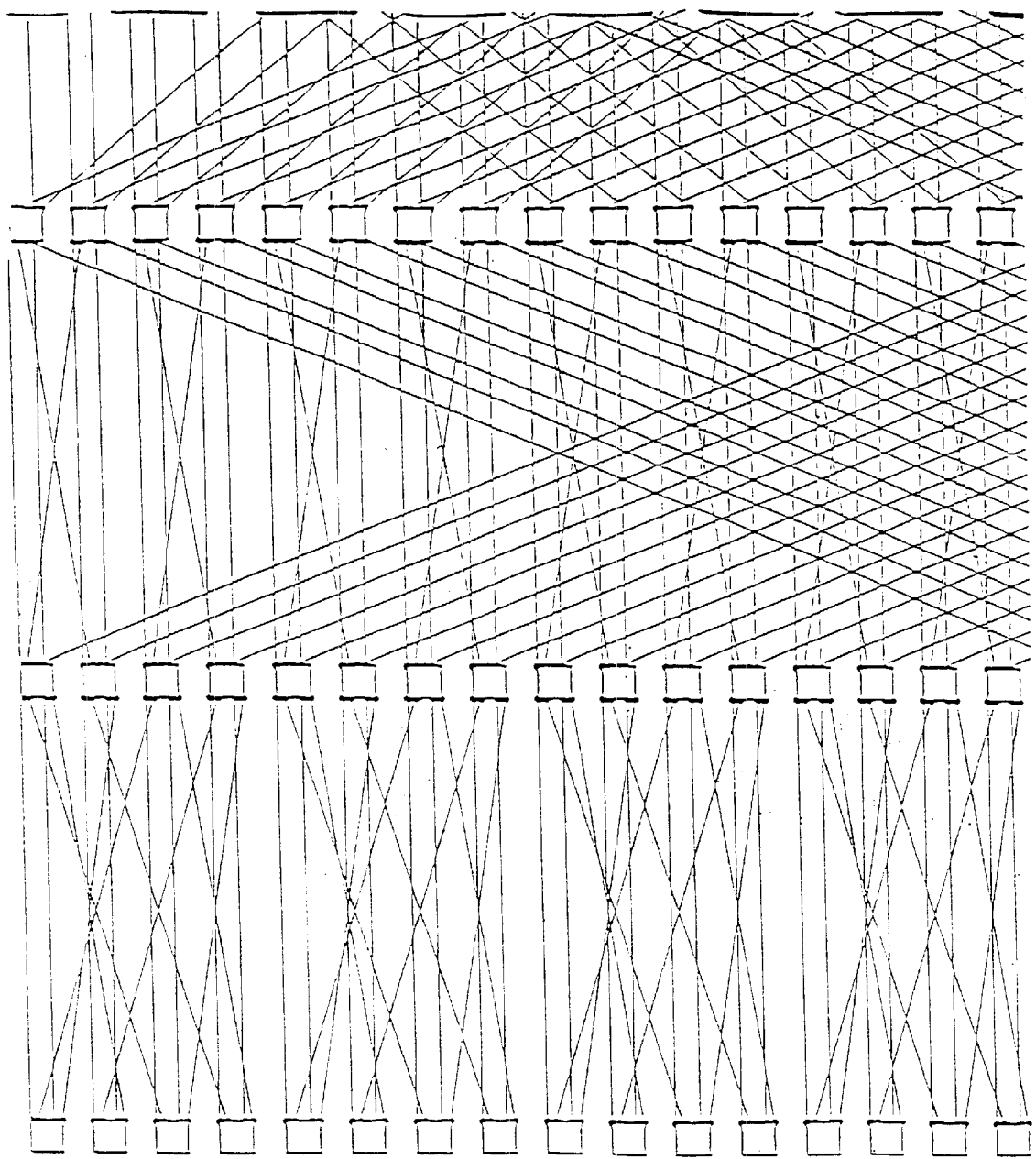
FIGS. 6a, 6b, 6c and 6d are arranged relative to each other.
Figure 6B:
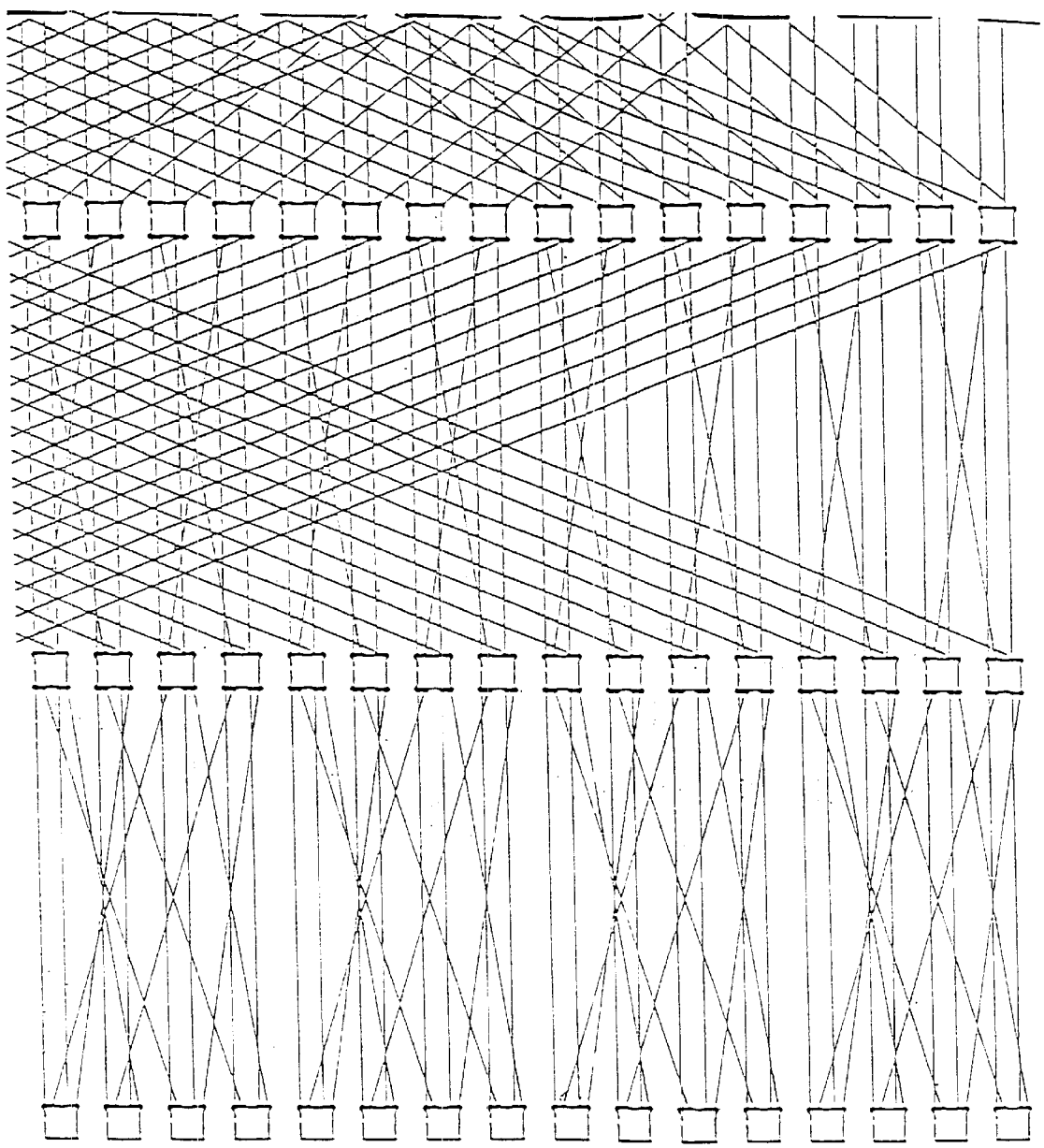
Figure 6C:
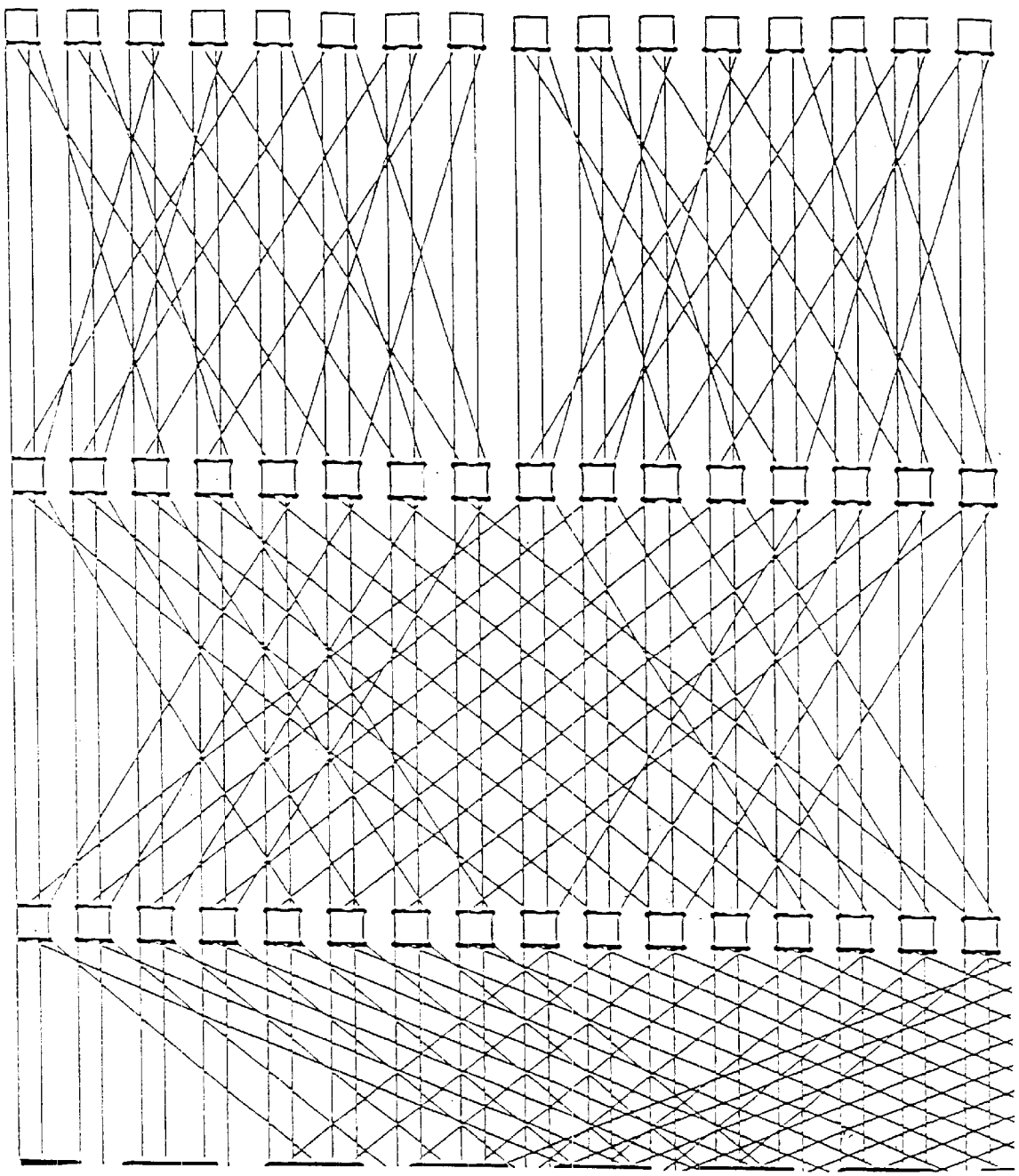
Figure 6D:
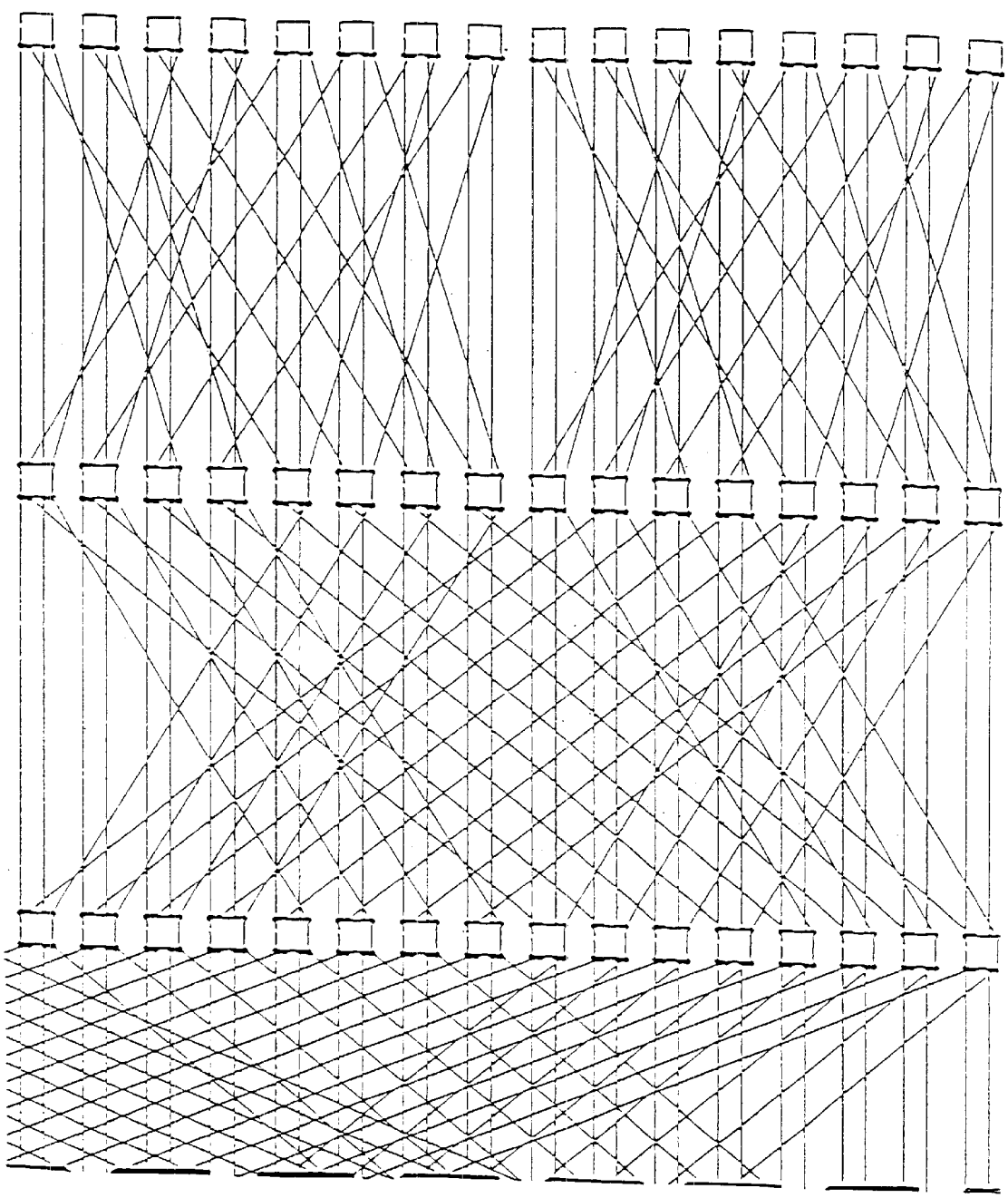

The switches in both the upper half-network and the lower half-network are next grouped into groups A, B, C, and D. Group A, as shown in FIGS. 6a, 6b, consists of the switches numbered 0–7. Group B, shown in FIGS. 6a, 6b, consists of the switches numbered 8–F in hexadecimal. Group C, shown in FIGS. 6c, 6d, consists of the switches numbered 10–17. Group D, shown in FIGS. 6c and 6d, consists of the switches numbered 18–F. The folded configuration of FIGS. 6a–6d is now "squared" or translated to a scalable implementation in which the switches are laid out in a square such that every switch whose row number differs by a single bit lie up, down, left, or right of each other.

Figure 8:
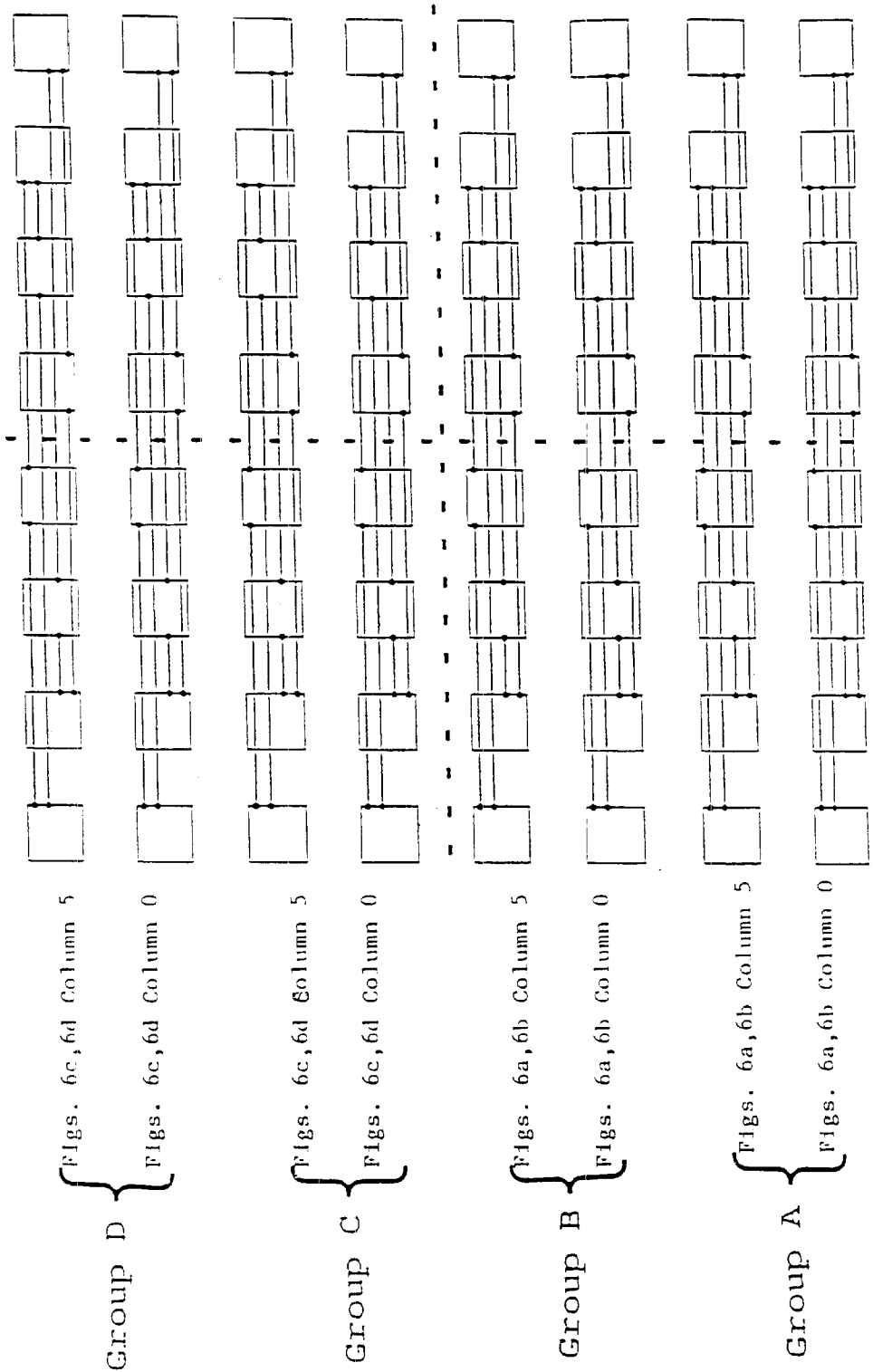
Figure 10:
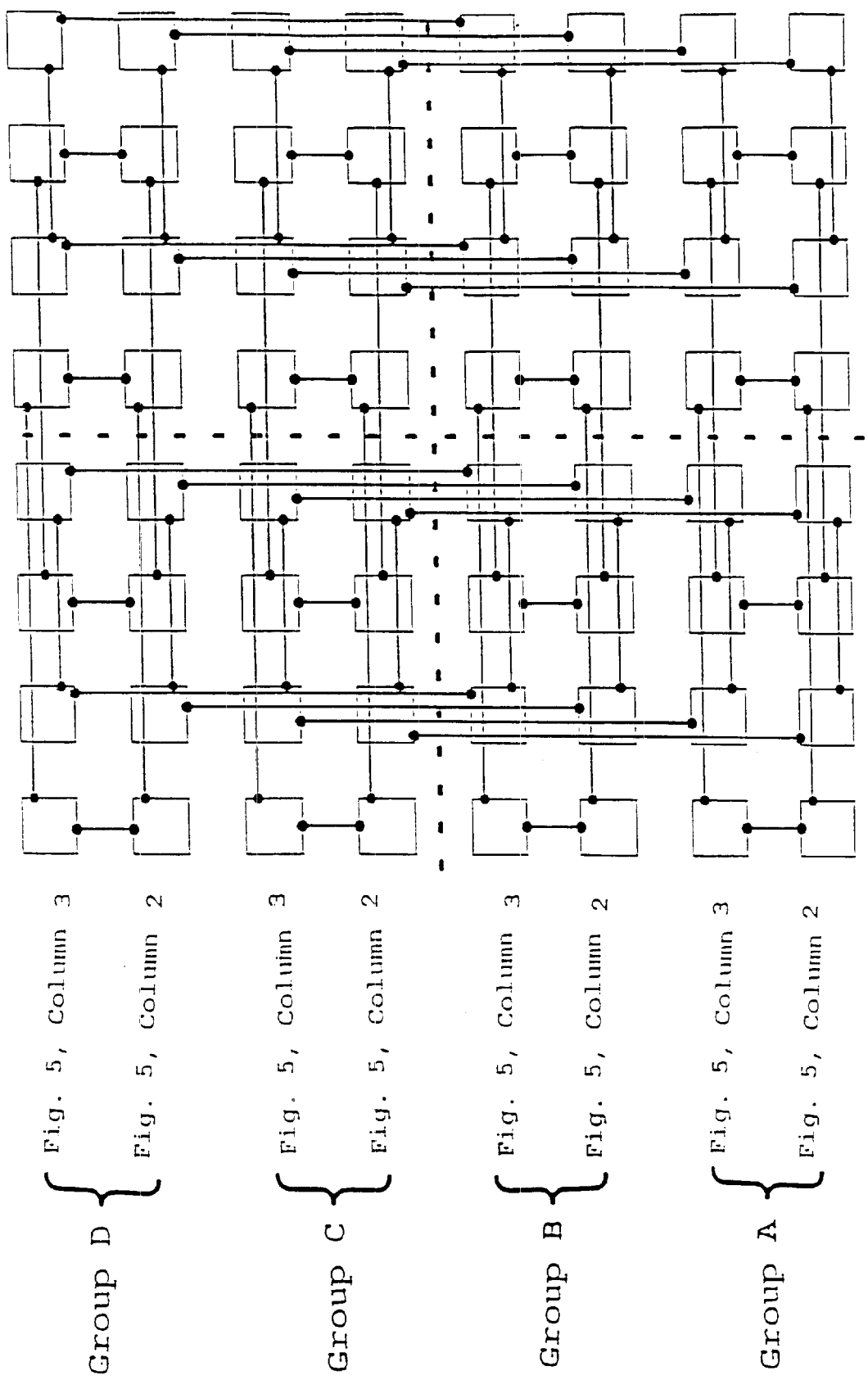

Reference is now made to FIG. 7, which shows the hexadecimal numbering pattern for the basic 4×4 switch building block, which applies to the switches of FIGS. 6a–6d, and consequently to FIGS. 8, 9 and 10. This numbering pattern applies to pairs of columns 5,0 and 4,1 and 3,2, respectively, of FIGS. 6a–6d. FIGS. 8, 9 and 10 contain switches that form the same interconnection pattern as that shown in FIGS. 6a–6d.

The panels used to implement networks of FIGS. 6a–6d in a sandwiched rectangular or square configuration of panels is illustrated in FIGS. 8, 9 and 10 and is dependent on the selected size of the basic network panel. For example, the panels of FIGS. 8, 9 and 10 contain 8 ranks and 8 files of switches of building block group of switches, such as shown in FIG. 7. The words "rank" and "file" are used instead of "row" and "column" to distinguish the physical position of switch chips from their corresponding logical positions. Other initial building-block panels may contain any number of switches from 16 up to any even power of two. Although 256-switch building-block panels are possible, they would likely be more expensive than 4 combined 64-switch panels.

The panels of FIGS. 8, 9 and 10 each show all of the switches of two representative columns of switches from the interconnection pattern illustrated in FIGS. 6a–6d. The specific columns of switches contained on each of the panels of FIGS. 8, 9 and 10 are labeled on these figures. The switches of each file on a given panel of FIGS. 8, 9 and 10 are aligned into interleaved alternating ranks, which are labeled at the left-hand sides of these figures. For example, the bottom rank of switches in FIG. 8 corresponds to those that are found in column 0 group A of FIGS. 6a–6d. The switches in the next rank above this rank correspond to those of column 5 of group A. The other ranks appear in an alternating pattern from the bottom to top as column 0 group B, column 5 group B, column 0 group C, column 5 group C, column 0 group D and column 5 group D.

The second panel of switches shown in FIG. 8 that are positioned above the panel of switches shown in FIG. 8 consists of alternating ranks of switches from columns 1 and 4, which are arranged in the same alternating group pattern as that of FIG. 8. The third, or top panel, of switches, shown in FIG. 9, contains an alternating pattern of switches from columns 2 and 3.

Wiring must now be made between switches in each of the panels to implement the network of FIGS. 6a–6d. For example, interconnection wiring patterns between the switches of column 0 in the lower level panel of FIG. 8 must be made to switches in column 1 of the intermediate panel of FIG. 9 to preserve the wiring pattern of FIGS. 6*a*–6*d*. FIGS. 8, 9 and 10 show the wiring pattern between switches on different panels. The wiring shown by lines with black dots at the ends do not indicate a connection between switches of the same panel of figure. On each figure one block dot indicates that a wire is connected to a switch on the panel represented in that figure, while the black dot on the other end of the wire indicates that a connection is made to a switch either above or below the switches shown in the figure. All interconnection wires are shown by straight lines in all figures. The straight paths always route straight up and are therefore not shown. For example, interconnection is made in a vertical manner from the switches of the lower panel of FIG. 8 to switches on the intermediate panel of FIG. 8. In this manner, interconnections are made between switches of column 1 of the intermediate panel of FIG. 8 to switches of column 2 of the top panel of FIG. 9, between switches in columns 3 of the top panel and switches in column 4 of the intermediate panel and between switches in column 4 of the middle panel to switches in column 5 of the top panel.

The desirability of rotating the columns of switches can now be seen since the top layer of switches will consist of switches from columns 2 and 3 of FIGS. 6*a*–6*d*. These connections are the longest connecting paths and they may be made on the plane itself without through-hole connections between panels.

In FIGS. 8 and 9 an interconnection wire has a connection at the output terminal of a switch of a column that has a number that is one less than the number of the column that has an input terminal to which the wire is connected and is located directly above or below such switch. FIG. 10 shows the interconnection path that provides connections between switches in the top panel of FIG. 10 to switches in the intermediate panel 9. By reference to FIGS. 6–10, all of the correct interconnections between all of the switches on FIGS. 8–10 can be directly traced. Only the diagonal connections of FIGS. 6*a*–6*d* are represented in FIGS. 8, 9 and 10, it being understood that the straight connections required to complete the wiring topology of FIGS. 6*a*–6*d* must also be made. These straight connections are not illustrated in FIGS. 8, 9 and 10 due to the added complexity that they would add to these figures without providing additional teaching.

Larger size networks may be implemented by constructing a network diagram for any size network and following the procedure described above. However, after a given size network is implemented as illustrated by FIGS. 8, 9 and 10, further expansion may be achieved by the following described procedure in which the interconnection pattern between a number of the columns of switches nearest the input side and a number of the columns of switches nearest the output side may be retained. This is achieved because the addition of new columns of switches with this procedure will not require the assignment of new row address routing bits for these columns of switches with this procedure. The assignment of new row address bits, however, is required to complete the interconnection of the expanded size network for the new columns of switches.

Figure 11:
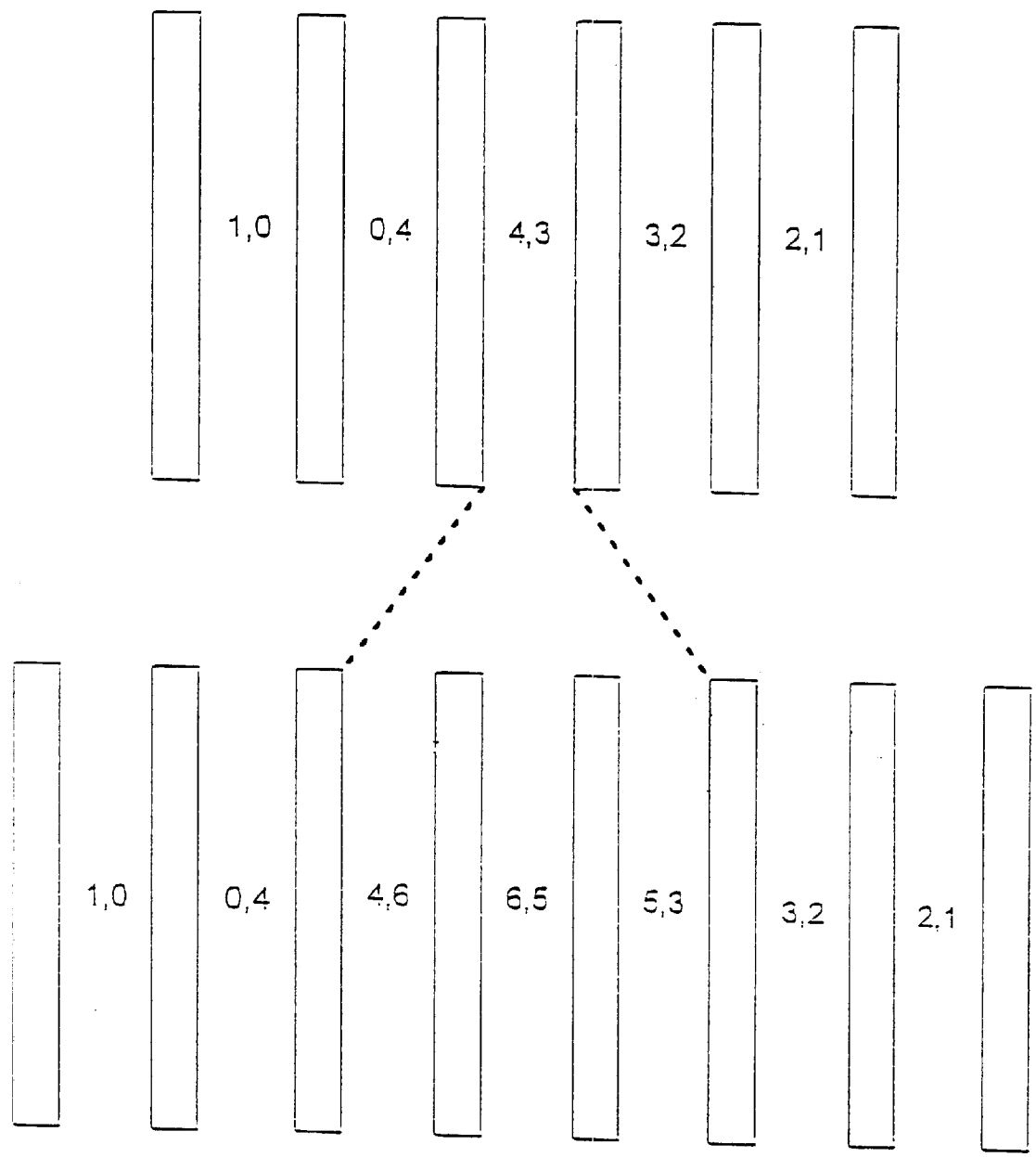
FIG. 11 is a diagram which illustrates in its upper portion the six columns of switches of the implementation of FIGS. 6a–6d, and in its lower portion an expanded network of eight columns of switches along with the row-routing address bits used by these networks.
Figure 12A:
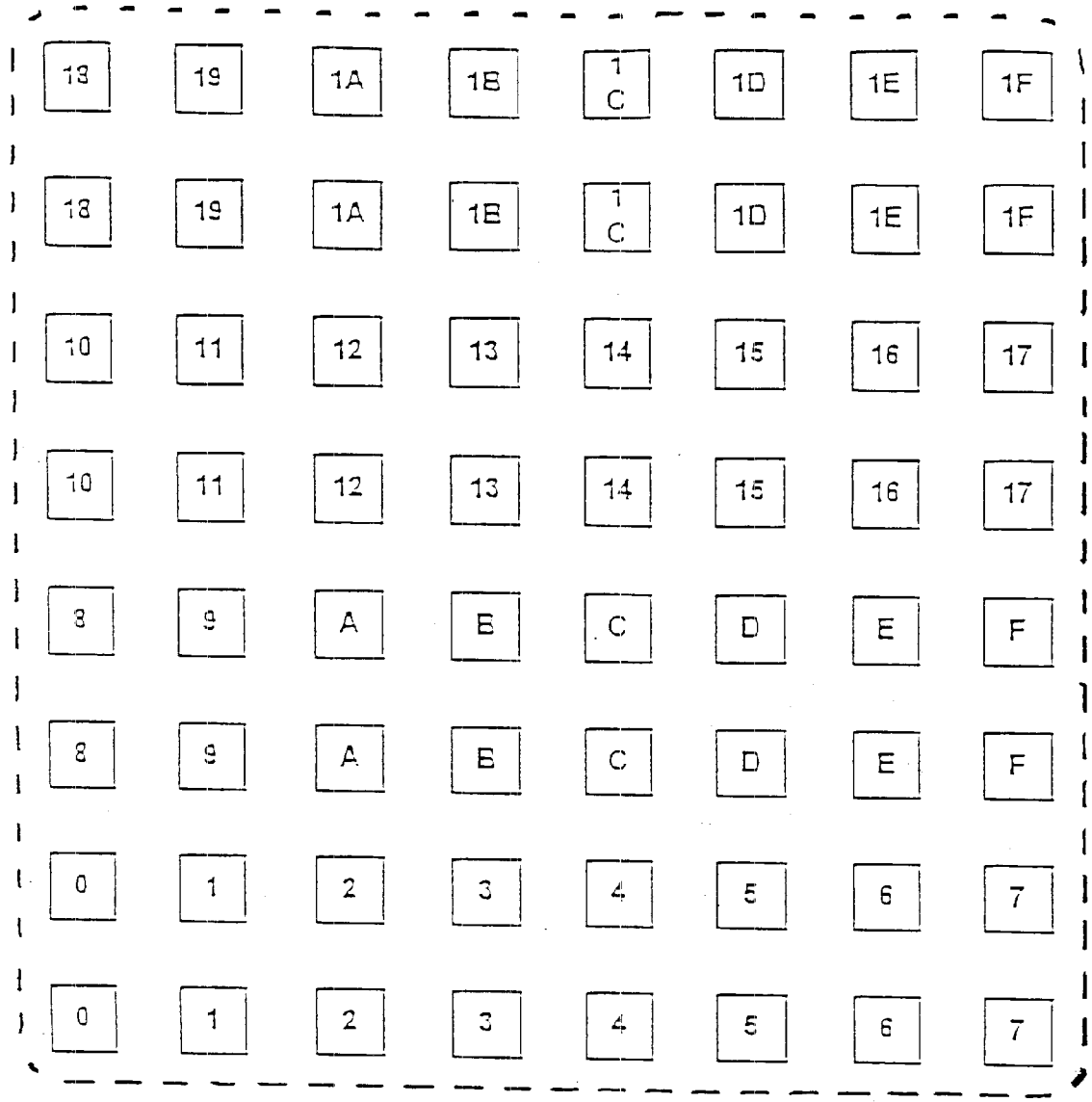
Figure 12C:
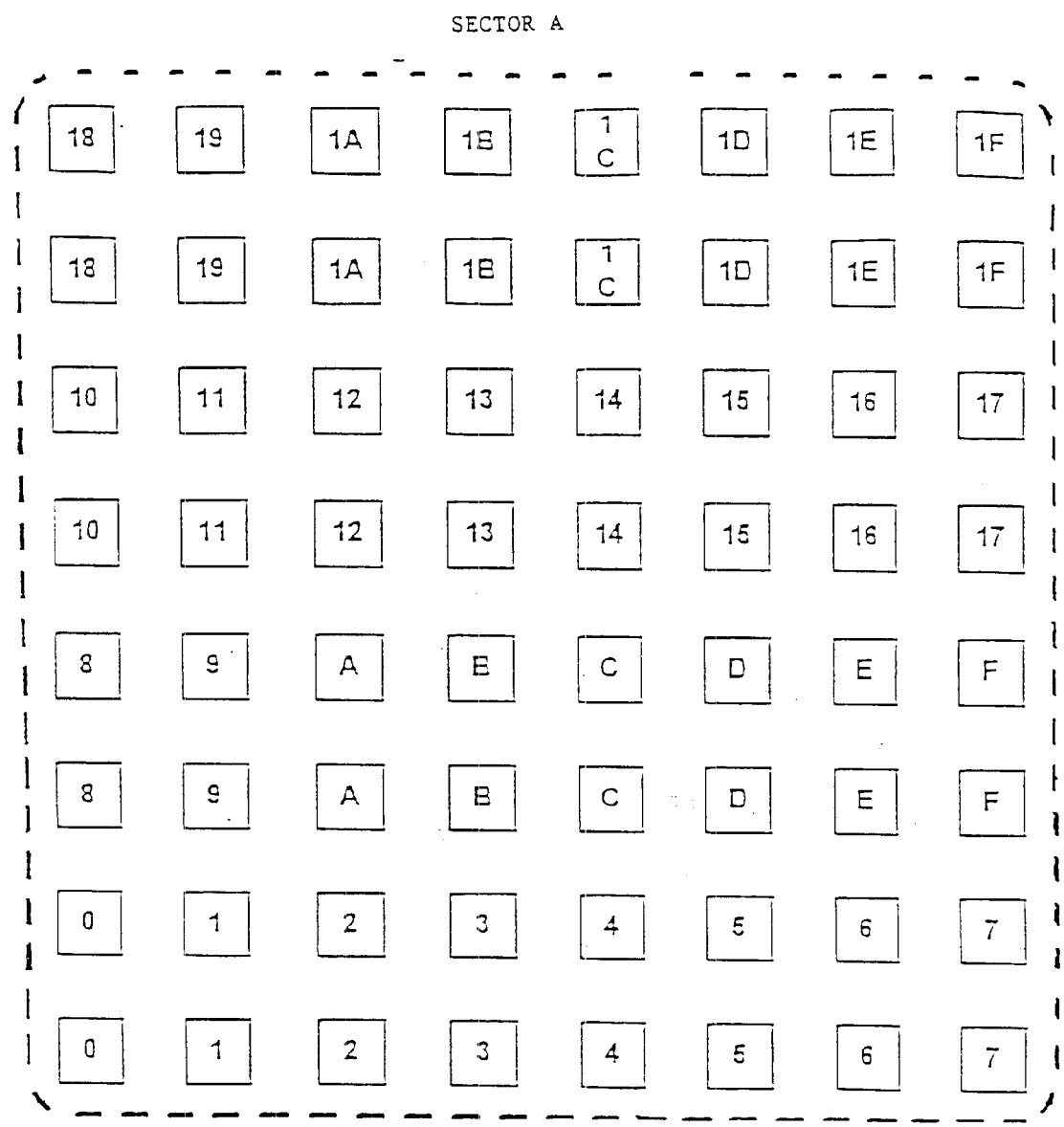
Figure 12D:
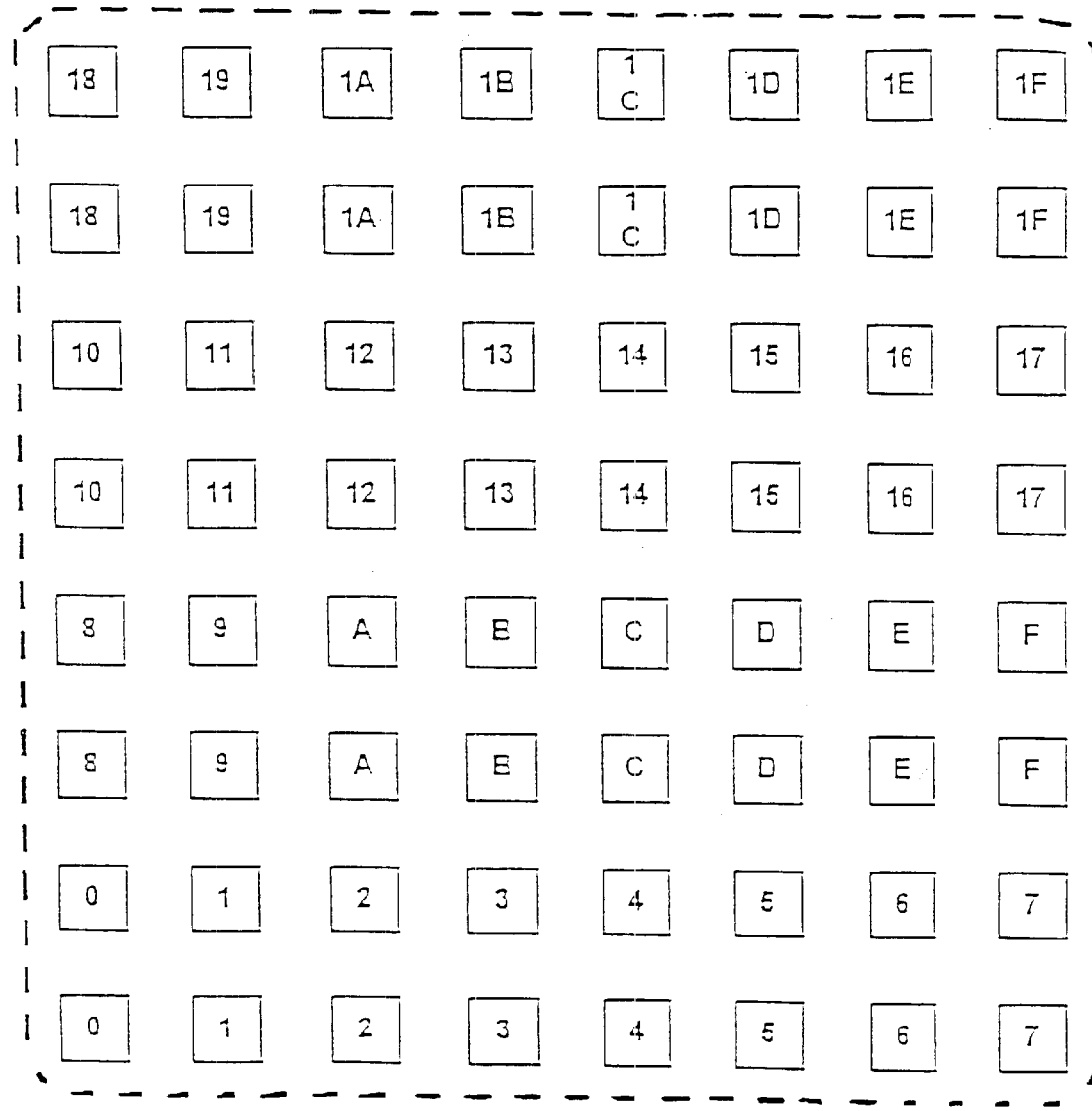
Figure 13A:
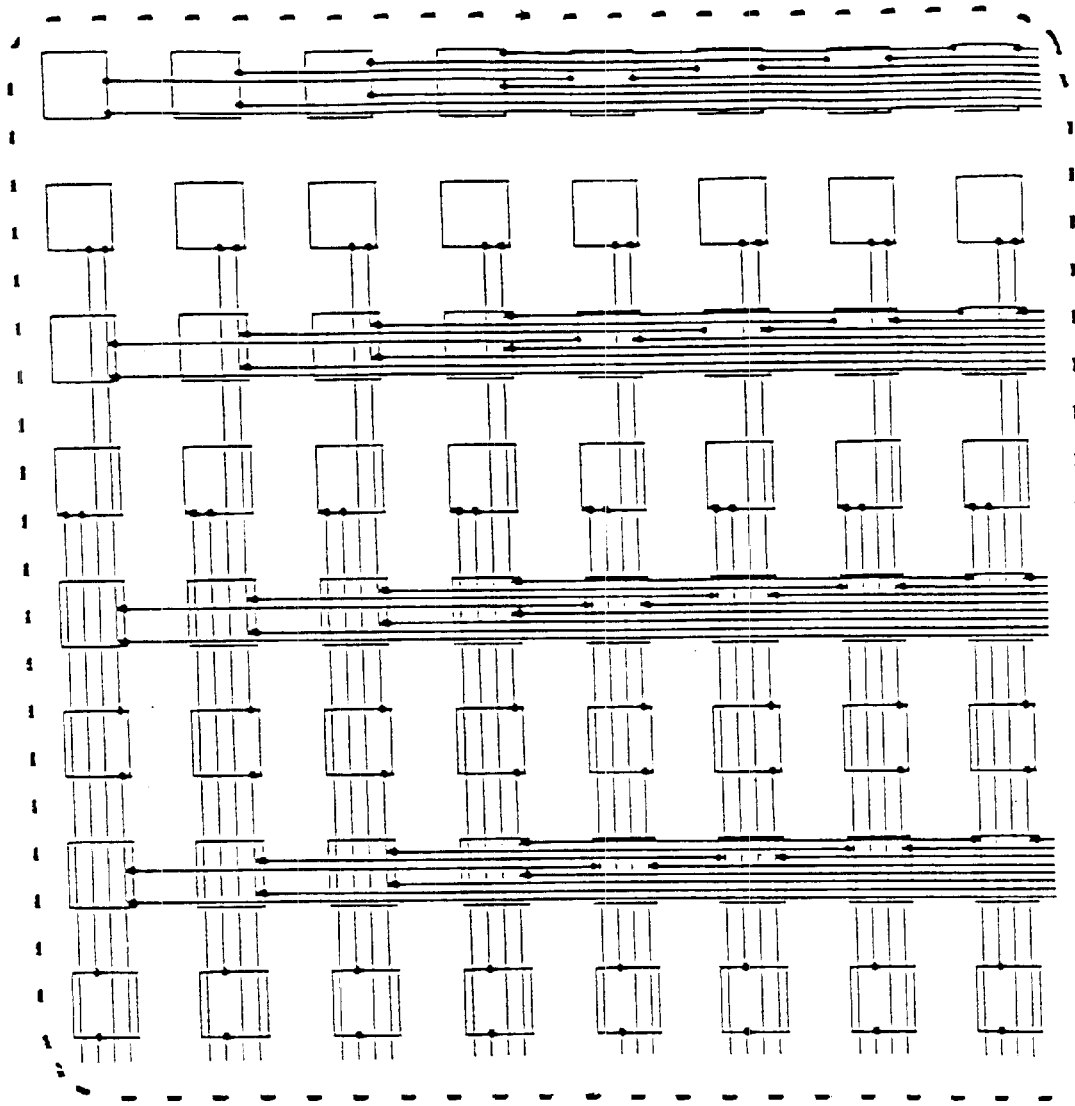
FIGS. 13a, 13b, 13c and 13d are arranged relative to each other.
Figure 13B:
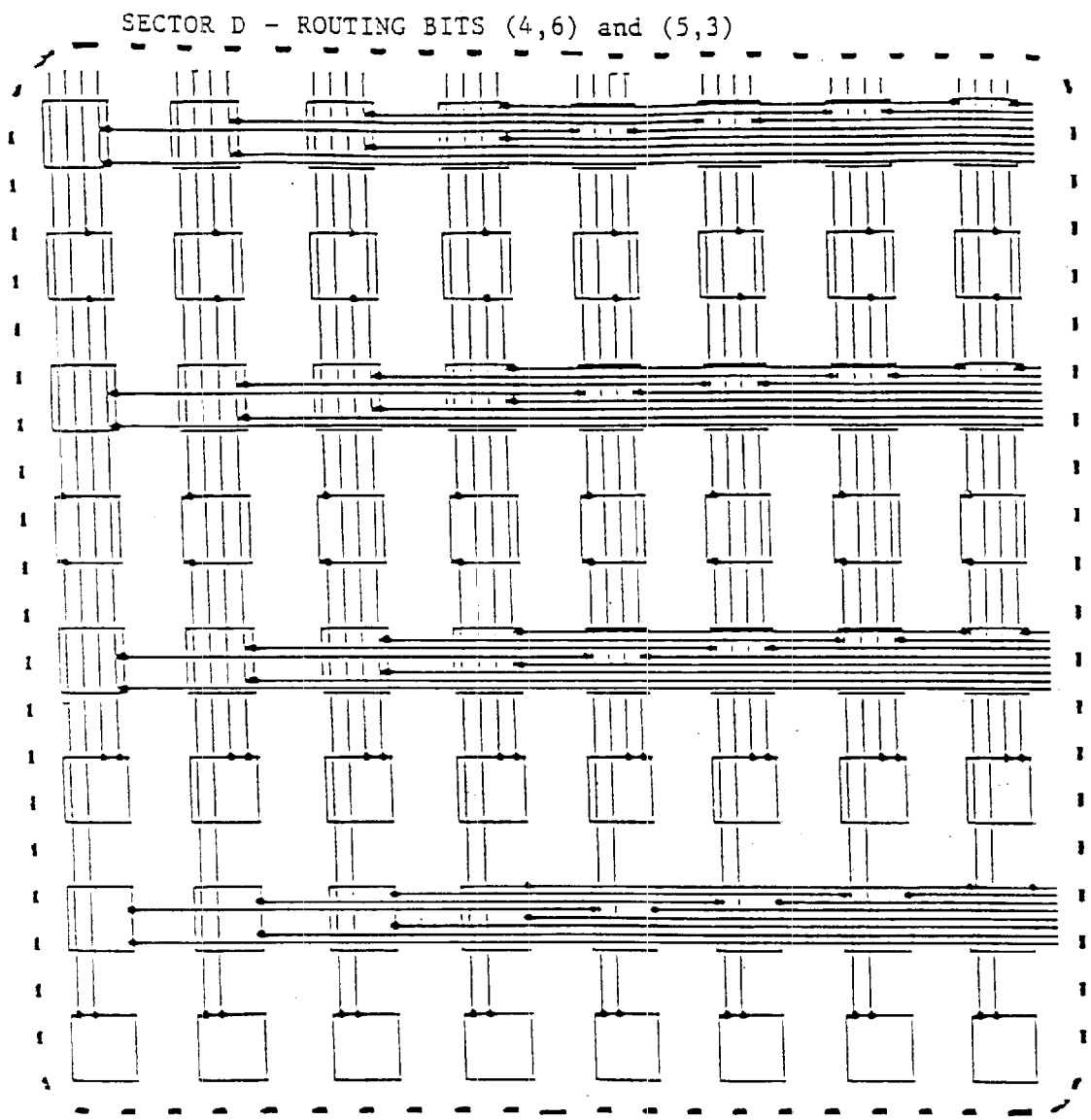
Figure 13C:
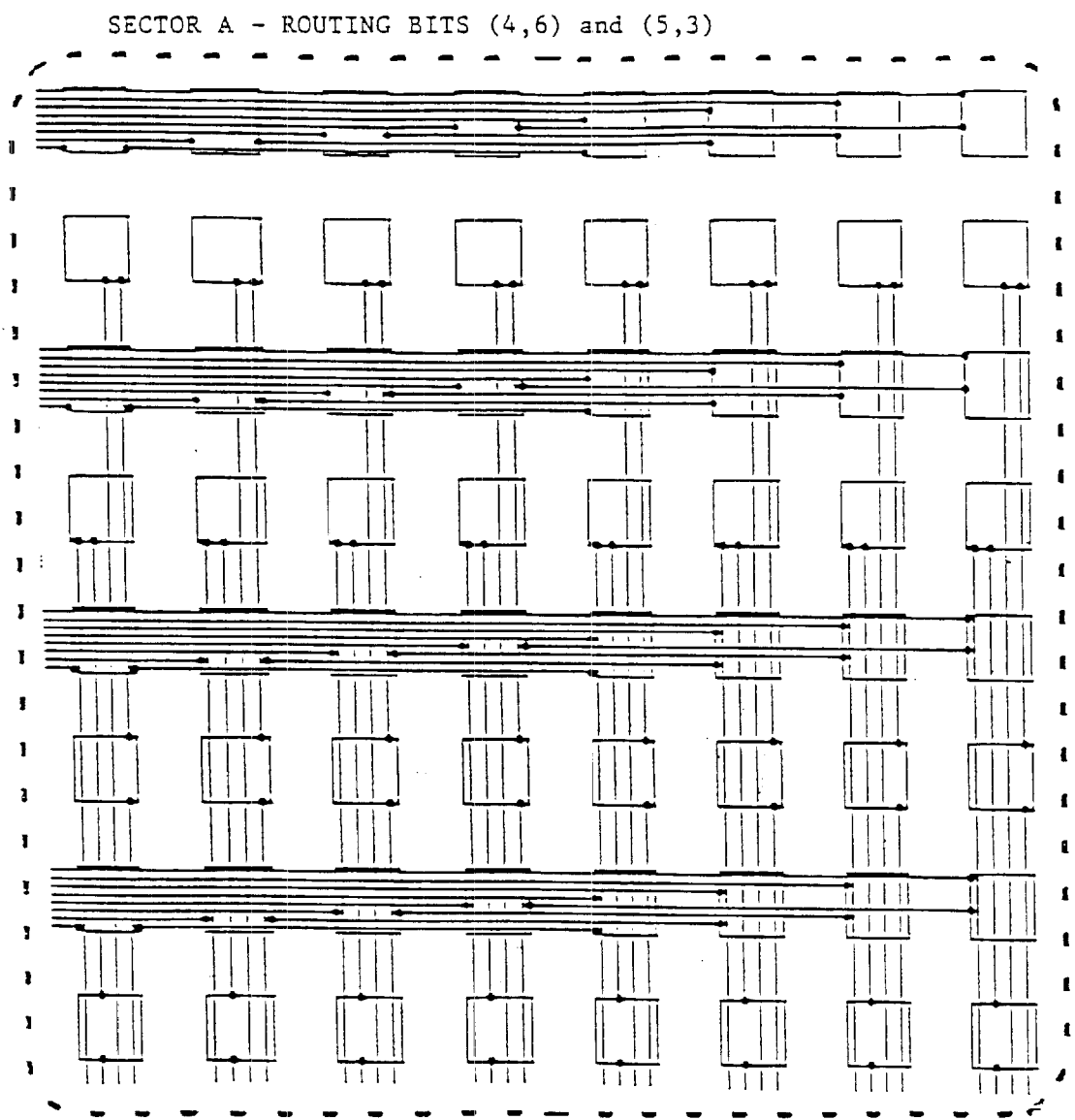
Figure 13D:
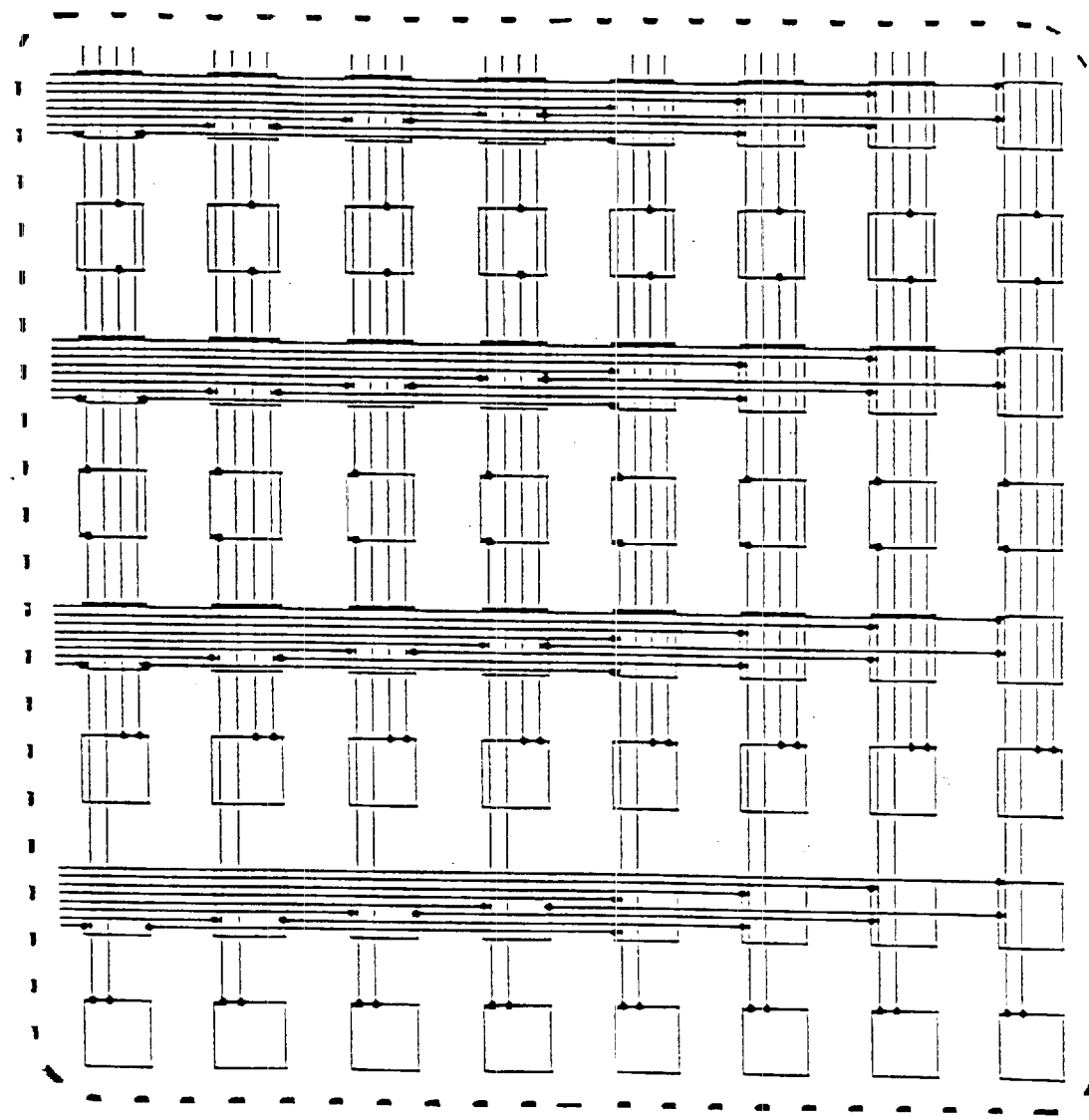

FIG. 11 is a diagrammatic representation of columns 0–5 of FIGS. 6*a*–6*d*. The wiring address bits that are used to form the wiring pattern of FIGS. 6*a*–6*d* are labeled between columns represented at the top of FIG. 11. The diagram at the bottom of FIG. 11 shows an expansion of the network in accordance with the related invention to form a 128-node network with 8 columns of switches numbered 0–7.

The topology, or interconnection pattern, of the network with two additional columns of switches that is represented by the lower portion of FIG. 11 requires three new combinations of row address routing bits 4,6 and 6,5 and 5,3; instead of the row address routing bits 4,3. New row routing address bit combination 4,6 is used to make diagonal interconnections between switches in columns 2,3, row routing address bit combination 6,5 is used to make interconnections between switches in columns 3 and 4, and row routing address bit combination 5,3 is used to make interconnections between switches in columns 4 and 5.

The particular combination of row routing address bits indicated by the bottom portion of FIG. 10 is not the only possible implementation, since many permutation combinations of row address routing bits can be employed within the scope of the related invention, providing the longest diagonal path wiring is maintained on the top panel of switches.

Expansion of the network to a 128-node network may be obtained by adding another switch panel to the panels of four, 32-node networks of FIGS. 6*a*–6*d* along with appropriate wiring. This is accomplished by utilizing four of the 8×8 switch-panel sandwiches previously disclosed to form a larger network, as shown in FIGS. 12*a*–12*d*. The expanded network, after adding another, four-times-larger panel, will then each have 256 switches in each four-times-larger panel.

FIGS. 12*a*–12*d* show a panel using four 8×8 sub-panels, which contain switches numbered as in FIG. 7, that are arranged into four sections which are labeled sector A, sector B, sector C, and sector D, respectively. Corresponding groups of four 8×8 sub-panels of the same type are also provided on the other three assembly layers. The switches in sector A are interconnected in accordance with the wiring bits indicated at the bottom of FIG. 11 of the 8-column expanded network. Thus, sector A will provide switches for rows 0–31 of the network. Sector B will provide switches for rows 32–63, section C connections for rows 63–95 and sector D switches for rows 96–127 of the 128-row network.

Since the row routing address bits remain the same for the 128-row embodiment, the interconnections between the lowermost two panels that provide interconnections for the row routing address bit combinations: (0,1), (4,0), (1,2), and (2,3). FIGS. 13*a*–13*d* show the wiring patterns necessary to interconnect switches on different panels. The wiring in FIGS. 13*a*–13*d* shows the wire paths that interconnect column 3 of the top panel to column 2 on the next lower panel and that interconnection column 4 of the top panel to column 5 of the next lower level for the four sector arrangement of FIGS. 12*a*–12*d*. The panels of FIGS. 8 and 9 are replicated four times, once within each sector. Because of the renumbering of the columns of the network at the bottom of FIG. 11, when the two new columns were added, column 6 of the expanded 128-row network corresponds to column 4 of the 132-row network, and column 7 of the expanded 128-row network corresponds to column 5 of the 32-row network.

The panel next to the top panel in the 128-row network will have a new interconnection routing pattern to route row address routing bits 4,6 and 5,3 and 6,5, as shown in FIG. 11, to provide interconnections between the switches of columns 2 and 3; and between the switches of columns 4 and 5; and between the switches of columns 3 and 4, respectively, of the 128-row network in a manner in accordance with the wiring methodology described for the 32-row network of FIGS. 6*a*–6*d*.

Figure 14A:
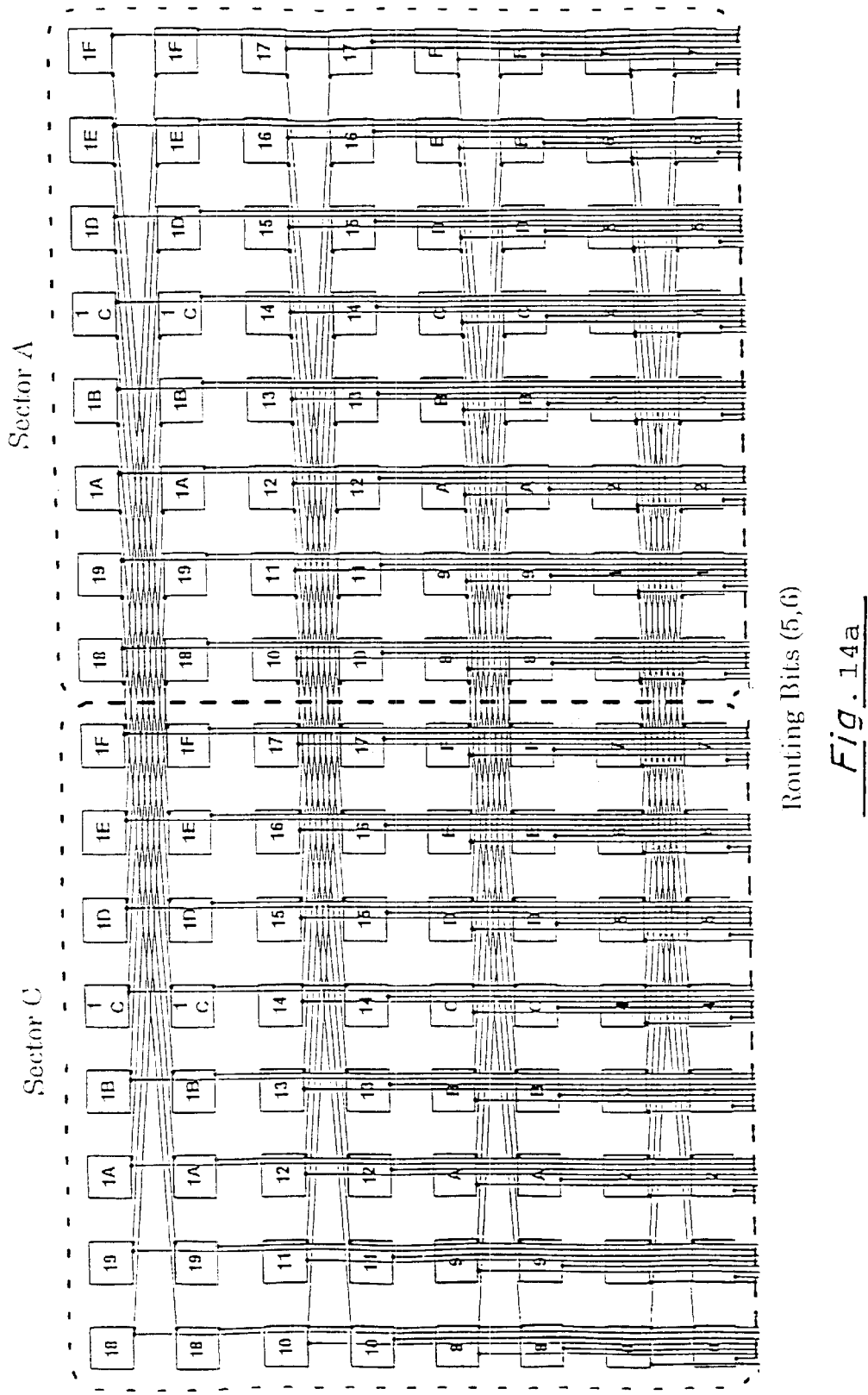
FIGS. 14a and 14b are arranged relative to each other.
Figure 14B:
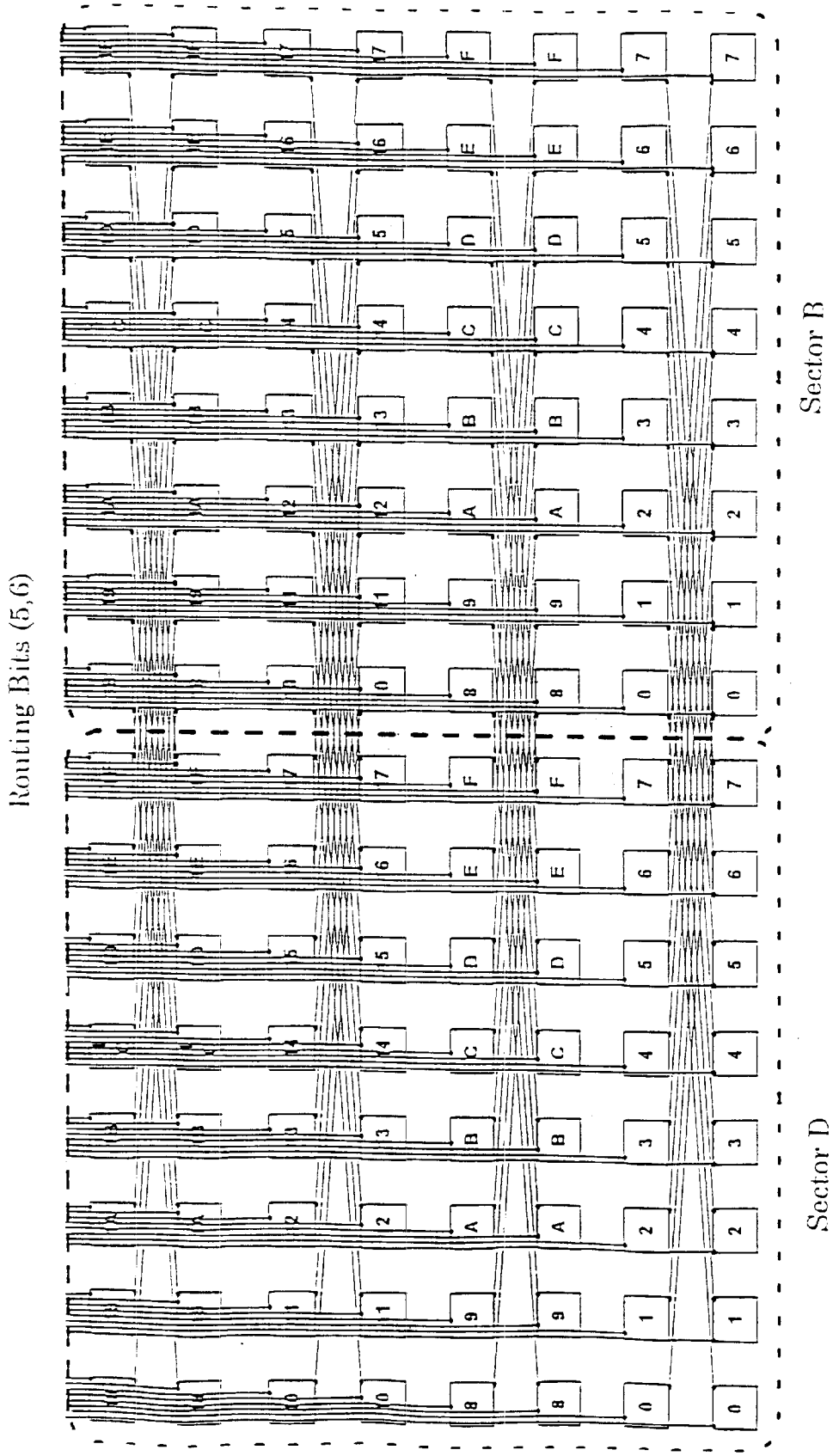

The top panel of the 128-row network of FIGS. 14*a* and 14*b* has the wiring pattern that is formed by the longest diagonal connections in the 128-row network that are routed by the row-routing address bits 6, 5. As in the 32-row network, this wiring pattern is all in the same panel and all of the wiring paths shown in FIGS. 14a and 14b are represented by straight lines that run directly between sectors across these figures. These straight wiring paths, shown in FIGS. 14a and 14b, interconnect switches that have the same switch number in different sectors. For example, a switch in sector C that is numbered 19 is connected to a switch numbered 19 in sector A, and a switch that is numbered 1F in sector D is connected to a switch numbered 1F in sector B.

Figure 15:
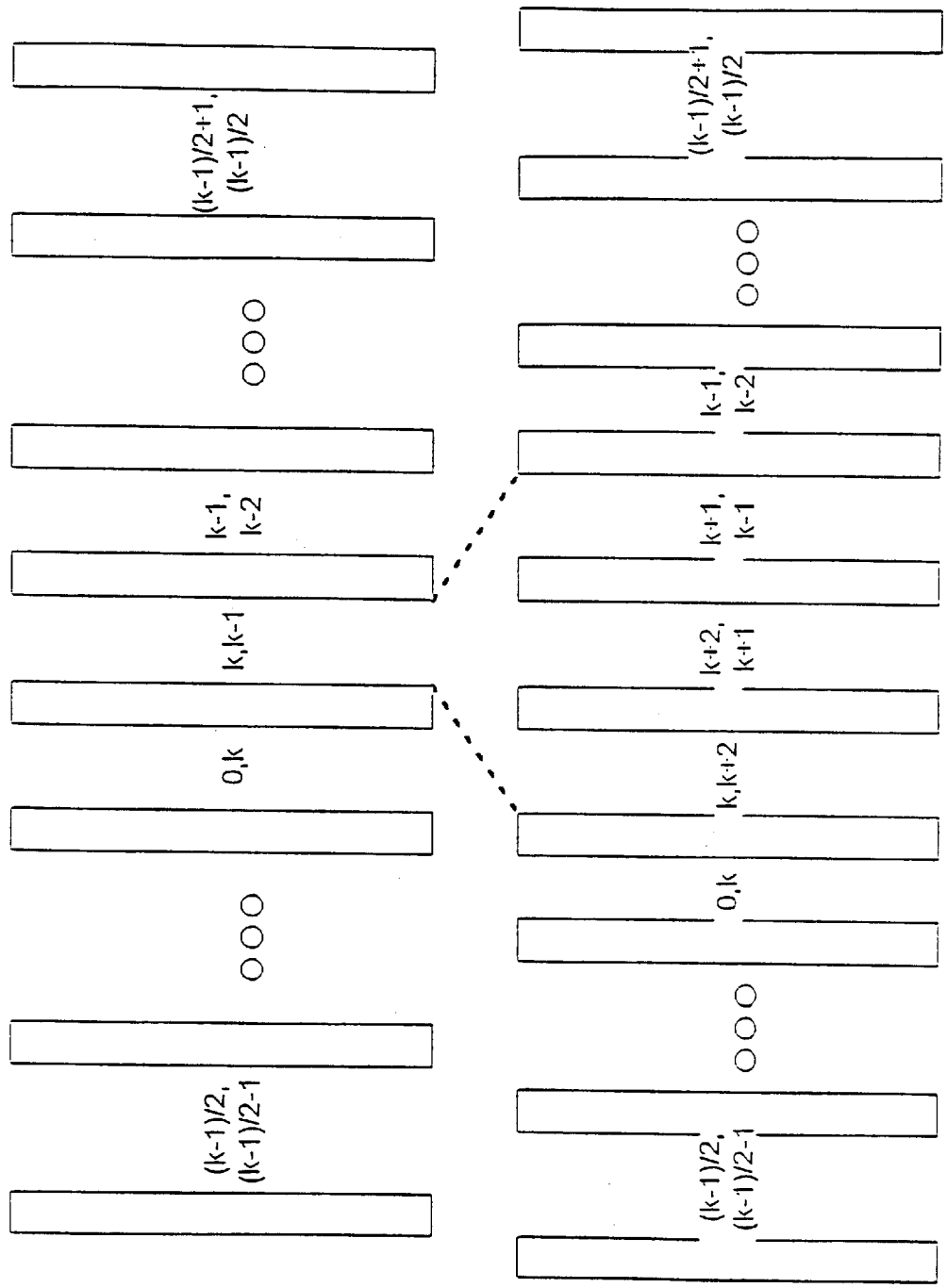
FIG. 15 is a diagram of an expansion of a network in accordance with the present invention, may be obtained either by construction or by formula.

FIG. 15 is a diagrammatic illustration which illustrates how a generic network shown at the top of FIG. 15 can be expanded into the next larger size network (four times larger) by adding two columns contained in one additional panel and new top layer while retaining the longest wires at the center of the network. In the bottom expanded network the values of k+2, k+1 from the original network may be set equal to k', and k'−1), respectively.

The manner in which expansion may be implemented is described below where:

N=p=number of rows in the network, and k=log$_2$N−1—highest address bit.

For example, start with a 32-row network. (You can start with any size network where k is even.) Rotate the columns, as previously described, to put the longest wires in the middle (FIGS. 4a–4d and 5a–5d). The network may then be actually, or only conceptually or graphically, folded in the middle where fold is at the longest wires (see FIGS. 5a–5d). Each set of 2 columns overlap after the folding is assigned to a different panel of switch chips. The basic sub-panels from which any size network may be built consist of 16 switch chips each for manufacturing ease. Other sizes can be chosen. Assuming there are 2N switch chips per panel, then there are 2N/16 sub-panels per full panel. The panels have no wiring other than connections directly to the switch chips plus power and ground.

The layers of panels are stacked with wiring between the panels. The wiring is 3-dimensional connecting between adjacent layers. There then are (1+log$_2$N)/2 active panel layers. Only the very top layer of wires connects to the same panel since that is the only panel that has adjacent columns in the network. All other layers of wiring connect between adjacent panels. The bottom layer of wiring connects to the nodes and contains both the request and response sides of the network. The maximum distance between switch centers is √(2N)/2 since there are 2N switch chips per layer and the longest wire goes half way across a layer. From FIGS. 8, 9 and 10, it is seen that the longest wires spans 4 chips for N=32. I.e., √(2*32)/2=4.

When expanding the network size by a factor of 4, the routing address bit ordering is no longer a simple rotation of the standard ordering of the network. The modified ordering preserves the wiring of the lower ordered layers. Expansion of a network, as shown in FIG. 15, may be obtained either by construction or by formula.

FIG. 16 shows an edge view of an implemented "four-square" network, which shows a three-switch plane stock separated by three wire planes.

| Expansion by Construction Method | | | | | | | | | | | |
|---|---|---|---|---|---|---|---|---|---|---|---|
| Rows k | | | Routing address bits | | | | | | | | |
| Normal network ordering | | | | | | | | | | | |
| 32 | 4 | | 0.4 | 4.3 | 3.2 | 2.1 | 1.0 | | | | |
| Rotate | | | | | | | | | | | |
| 32 | 4 | | 1.0 | 0.4 | 4.3 | 3.2 | 2.1 | | | | |
| Delete center column | | | | | | | | | | | |
| 128 | 6 | | 1.0 | 0.4 | | 3.2 | 2.1 | | | | |
| Move out left and right 1 column | | | | | | | | | | | |
| 128 | 6 | 1.0 | 0.4 | | | 3.2 | 2.1 | | | | |
| Fill in 3 center columns | | | | | | | | | | | |
| 128 | 6 | | 1.0 | 0.4 | 4.6 | 6.5 | 5.3 | 3.2 | 2.1 | | |
| Delete center column | | | | | | | | | | | |
| 512 | 8 | | 1.0 | 0.4 | 4.6 | | 5.3 | 3.2 | 2.1 | | |
| Move out left and right 1 column | | | | | | | | | | | |
| 512 | 8 | 1.0 | 0.4 | 4.6 | | | 5.3 | 3.2 | 2.1 | | |
| Fill in 3 center column | | | | | | | | | | | |
| 512 | 8 | 1.0 | 0.4 | 4.6 | 6.8 | 8.7 | 7.5 | 5.3 | 3.2 | 2.1 | |
| Delete center column | | | | | | | | | | | |
| 2048 | 10 | 1.0 | 0.4 | 4.6 | 6.8 | | 7.5 | 5.3 | 3.2 | 2.1 | |
| Mover out left and right 1 column | | | | | | | | | | | |
| 2048 | 10 | 1.0 | 0.4 | 4.6 | 6.8 | | | 7.5 | 5.3 | 3.2 | 2.1 |
| Fill in 3 center columns | | | | | | | | | | | |
| 2048 | 10 | 1.0 | 0.4 | 4.6 | 6.8 | 8.10 | 10.9 | 9.7 | 7.5 | 5.3 | 3.2 2.1 |
| stage | | 0 | 1 | 2 | 3 | 4 | 5 | 6 | 7 | 8 | 9 10 |
| stage | | 0 | 1 | 2 | 3 | 4 | k/2 | ... | | k-2 | k-1 k |

The general formula for a particular k is (split on 2 lines for clarity of the formulas):

| Stage | 0 | 1 | 2 | 3 | 4 | k/2 | ... | | k-2 | k-1 | k |
|---|---|---|---|---|---|---|---|---|---|---|---|
| p1c | 1 | 0 | 4 | ... | k-4 | k-2 | k | k-1 | k-3 | ... | 5 | 3 | 2 |
| p0c | 0 | 4 | 6 | ... | k-2 | k | k-1 | k-3 | k-5 | ... | 3 | 2 | 1 |

Note the outer 4 are special cases and do not fit the formula progression. The formula progression always stops on the left at 4,6 and on the right at 5,3. Now relate the address bits to the stage number (except for the outer 4).

| stages=s | P1c | p0c |
|---|---|---|
| 0 | 1 | 0 |
| 1 | 0 | 4 |
| 2 ... K/2−1 | 2s | 2(s+1) = p1c + 2 |
| k/2 | K | k−1 |
| k/2+1 ... k−2 | k−2(s−k/2)+1 | k−2(s−k/2)−1=p1c−2 |
| k−1 | 3 | 2 |
| k | 2 | 1 |

The end conditions check as shown by:

s=2 p1c=2s+2*2=4 p0c−2(s+1)=2(2+1)=6=p1c+2 s=k/2−1 p1c=2s=2*(k/2−1)=k−2 p0c=2(s+1)=2*(k/2−1+1)=k=p1c+2 s=k/2+1 p1c=k−2(s−k/2)+1=k−2*(k/2+1−k/2)+1=k−2+1=k−1 p0c=k−2(s−k/2)−1=k−2*(k/2+1−k/2)−1=k−2−1=k−3=p1c−2 s+k−2 p1c=k−2(s−k/2)+1=k−2*(k−2−k/2)+1=k−(2k−4−k)+1=k−(k−4)+1=5 p0c=k−2(s−k/2)−1=k−2*(k−2−k/2)−1=k−(2k−4−k)−1=k−(k−4)−1=3=p1c−2

There are many equivalent ways to order the address bits depending on how many special cases you want on the two ends. One such example is:

| Rows k | Routing address bits | | | | | | | | |
|---|---|---|---|---|---|---|---|---|---|
| stage | | 0 | 1 | 2 | 3 | 4 | 5 | 6 | 7 | 8 |
| stage | 0 | 1 | 2 | 3 | k/2 | ... | k−2 | k−1 | k |
| 512 | 8 | 0.2 | 2.4 | 4.6 | 6.8 | 8.7 | 7.5 | 5.3 | 3.1 | 1.0 |

With this example the only special case is on the far right. This example is represented in the table below.

| stages=s | P1c | p0c |
|---|---|---|
| 0 ... k/2−1 | 2s | 2(s+1) = p1c +2 |
| k/2 | K | k−1 |
| k/2+1 ... k−1 | k−2(s−k/2)+1 | k−2(s−k/2)−1=p1c−2 |
| k | 1 | 0 |

The more general case only directly specifies where the k and k−1 address bits go, which is where the longest wires are. It is those wires that change when going to larger networks and so they must be in the middle columns. Remember that the middle-wiring column ends up at the top of the network.

stage 0 1 2 ... k/2−2 k/2−1 k/2 k/2+1 k/2+2 ... k−2 k−1 k p1c $P_0$ $P_1$ $P_2$ ... $P_{k/2-2}$ $P_{k/2-1}$ k k−1 $P_{k/2}$ ... $P_{k-4}$ $P_{k-3}$ $P_{k-2}$ p0c $P_1$ $P_2$ $P_3$ ... $P_{k/2-1}$ k k−1 $P_{k/2}$ $P_{k/2+1}$ ... $P_{k-3}$ $P_{k-2}$ $P_0$ where k=log$_2$N−1=Highest address bit and the set {$P_0$ ... $P_{k-2}$} is any permutation of the set {0 ... k−2}. The expansion to larger size networks is then the same as the construction method in paragraph 3 and the formulas are the same except the end points are different to take into account the permutations. Further, the 2 new address bits (k+1, k+2) can also be permuted as shown below for the (k, k−1) case.

Another valid arrangement swaps k and k−1:

stage 0 1 2 ... k/2−2 k/2−1 k/2 k/2+1 k/2+2 ... k−2 k−1 k p1c $P_0$ $P_1$ $P_2$ ... $P_{k/2-2}$ $P_{k/2-1}$ k−1 k $P_{k/2}$ ... $P_{k-4}$ $P_{k-3}$ $P_{k-2}$ p0c $P_1$ $P_2$ $P_3$ ... $P_{k/2-1}$ k−1 k $P_{k/2}$ $P_{k/2+1}$ ... $P_{k-3}$ $P_{k-2}$ $P_0$ The wiring can also be extended to other networks, including layered networks having more than 2 layers by similar rules to the general case presented above. Layered and layers in this sense has the meaning ascribed to these words in the U.S. Pat. No. 4,833,468 patent. The present and related inventions are not limited to just layered networks, however; they apply to any network that uses a plurality of row-routing address bits to route between adjacent columns of switches. For example, the present and related inventions also apply to single-layer networks, such as the Banyan or baseline network, as follows:

stage 0 1 2 ... k/2−2 k/2−1 k/2 k/2+1 k/2+2 ... k−2 k−1 k bit $P_0$ $P_1$ $P_2$ ... $P_{k/2-2}$ $P_{k/2-1}$ k $P_{k/2}$ $P_{k/2+1}$ ... $P_{k-3}$ $P_{k-2}$ $P_{k-1}$ where k=log$_2$N−1=Highest address bit, and the set {$P_0$ ... $P_{k-1}$} is any permutation of the set {0 ... k−1}. The expansion to larger size networks is then the same as the construction method described above. The formulas are the same except the end points are different to take into account the permutations. The network expansion method of the related invention applies to any network that uses binary routing with any number of address bits routed per switch.

2. Description of the Physical Switching Network

The switching network of the present and related inventions is compatible with the Scalable Interface Portocol "SCI"), IEEE 1596/1992, It has the bandwidth, latency, and shared memory operations suitable to implement, in a large but practically realizable configuration, a 24+ TeraFLOP/s parallel computer system.

The underlying interconnect topology of the preferred, "layered network", switching network of the present invention was taught in the companion patent application, and comprehensively recapitulated in section 1 of this specification. Section 1 has described the optimization of the logic topology of a multi-layer switching network, and a particular, large-scale, "layered network" switching network so optimized. The present section 2 discusses the physical realization and implementation of a real-world switching network in accordance with the optimized switching network topology, and certain technology permitting this physical realization and implementation.

2.1 Layered Network Topology

The preferred "layered network" topology utilized in the preferred switching network of the present invention consists of multiple shifted and overlaid copies of any of the well-known baseline-equivalent networks such as the reverse banyan network. Baseline-equivalent networks have been studies extensively, and are known to exhibit ideal scalability and latency characteristics, but to suffer from high blocking properties and lack of fault tolerance.

Multiple approaches have been proposed, and some have been implemented, addressing these issues. The inventors have found that overlaying multiple, shifted copies of a classical network permitted (i) a dramatic reduction in contention, and (ii) introduction of fault tolerance potential, without affecting scalability and latency. Each new copy is formed by shifting the base network by one more stage, with the last stage becoming the first. Then it is overlaid, switchpoint by corresponding switchpoint, into the previous network. An example of a 32-row layered network was shown in FIG. 3.

While it is possible to overlay shifted copies of the base network log N times (a "fully"-layered network), typically the switch properties affected by the second copy are enough improved that additional layers are not cost effective. A two-layered network may be implemented where one of the straight paths between the same pairs of switchpoints is eliminated to save pads, pins, and wires. Thus the switchpoint will have three input ports that route to three output ports.

A layered network using 3×3 switchpoints having 64 rows and 128 SCI ringlets is depicted in FIG. 4. The layered topology specifies wiring of switchpoints in arbitrarily-large switches having an integer power of two number of ports.

2.2 Hundreds of Nodes, Thousands of Processors

The preferred switching network of the present invention can accommodate hundreds of nodes or thousands of processors because the network topology is scalable. FIG. 4 shows the wiring topology of the switching network at its 128-port size. Scalability is inherent because the topology grows with the number of ports N at the same theoretical minimum rate as a banyan network (N log N), and its latency similarly grows as log N.

2.3 Low Latency

The inventors believe that switch latency is the most important system parameter—even more important than processor speed. It matters little how fast a processor is when it is stalled due to a network delay!

The switching network of the present invention achieves low latency because a signal must traverse only a few switchpoints which take only a few clock cycles each. Specifically, the second-generation switchpoint has a latency of at most seven eight-nanosecond clock cycles or 56 ns. A switch with P ports has $\log_2$ P stages. Therefore, a 4096-port switch has a latency of only 672 ns for an eight (8) nanosecond clock cycle!

2.4 High Link Capacity and Bisection Bandwidth

The SCI protocol was selected for the switching network because of, in part, its high link capacity. The parallel, differential, double-edged SCI electrical protocol results in high raw bandwidth on each path, and the SCI logical protocols provide effective bandwidth utilization as well as the early availability of packet destination address access essential to quick switchpoint routing. Link capacity at each port is constant for any size switch. The current switch's peak bisection bandwidth is 150% of the aggregate, peak port bandwidth. Bisection bandwidth could be further increased using already-developed layered network theory, should it be shown necessary for large switches.

Switchpoint routing logic takes advantage of extra bisection bandwidth in the topology to reduce contention and provide fault tolerance.

Note that the bisection bandwidth must be a constant factor over the port bandwidth in any switching network. A growth that is sub-linear with port count would cause high contention in large switching networks, while a super-linear growth would undermine scalability.

The second-generation switchpoint under development has peak, link bandwidth of 500 MBytes/s. A 1 GigaByte/sec switchpoint is expected to be a semiconductor process upgrade activity.

2.5 Self-Routing Switchpoints

Each switchpoint chooses its routing independently, using only local information, for speed and robustness. Routing is decided by comparing the address of a packet with the switchpoint's position in the network. Re-circulated packets that did not reach their destination ringlet their first time through the network are given priority for port selection. Similarly, packets that cannot possibly reach their destination ringlet on this pass through the network (due to contention, faults or both) get last chance for port selection. These routing policies ensure that all packets are eventually routed (forward progress is guaranteed), and hopeless packets don't interfere with those that still can reach their destination this trip through the network. These policies minimize the effects of contention within the switch, and in behavioral simulations show excellent behavior in heavy loading and hot spot conditions.

2.6 Layered Network Topology Reduces Contention

The layered topology of the switchpoint wiring of FIG. 1*b* and the routing of switchpoints reduce switching network contention. At each stage, three different diagonal paths are available in addition to a single straight line path. The multiple diagonal paths provide many ways for a packet to reach its destination. Under high traffic these diagonal paths allow packets to reach their destinations despite the presence of other packets.

2.7 Multi-layer Switching Network Packaging Technology

As previously stated, the switching network of the present invention has the bandwidth, latency, and shared memory operations needed by 24+ TeraFLOP/s systems. The present invention is necessary in this range because commercial packaging technology does not scale well beyond 128 ports or so.

The present invention has its genesis in (i) the building of multi-chip modules (MCM), combined with (ii) on-going development of multistage interconnection networks. The present invention is a new packaging scheme for large switching networks called the "multi-layer switching network" by assignee of the invention Lockheed Martin Corporation.

The "multi-layer switching network" packaging of the present invention (i) packs switchpoints tightly, (ii) connecting them with short, straight, flat circuits. The flat circuits can be implemented as printed circuits upon a rigid substrate, but are commonly implemented with ribbon cable. Notably, the ribbon cable, although flexible, is maintained substantially planar (except for its bent ends), and is not flexed.

Importantly, this "multi-layer switching network" packaging of the present invention scales well to whatever size switching network is needed. Arbitrarily-large switching networks can be constructed from a single type of multi-chip module (MCM or tile) connected by flexible, printed circuits (flex) whose maximum length scales proportionally with the square root of the number of ports.

2.8 Tiles and Flex

The multi-chip module (MCM or tile) technology preferably used for the tiles in the "multi-layer switching network" packaging approach of the present invention is very attractive.

It has the ability to make connections on the surface of both sides of a tile. FIG. 6 depicts a tile containing 16 switchpoints. The small squares are locations where flex ribbons are attached by small clips to maintain electrical connection between the contacts on the surface of the tile and the flex ribbon that connects to another tile. The large square in the middle has connections for straight paths. The pattern of contacts is identical on both sides of the tiles.

2.9 "Multi-Layer Switching Network" Tiles

All switchpoints are embedded in identical tiles that are interconnected with flex cable, also known as ribbon cable. Each tile contains eight dual-switchpoint chips.

Tiles start from a thermally conductive substrate in which cavities are milled so that embedded dice's surfaces are level with the substrate. Vias are drilled through the substrate so connections can be made on both sides of the tile. Layers of wiring are deposited over the dice and substrate with a lithographic process. Connections to pads on dice are made directly without need for wire bonding. The resulting tiles are compact and sturdy.

2.10 Panels

Tiles are assembled into square panels. FIG. 7 shows a panel holding 16 tiles that would be used in a 256-port switch. Tiles are latched firmly in panels so that the heat generated within may be transferred to coolant flowing through the panels. Electrical connections for power and ground supplied by the panels are not shown. Panels are separated a few inches so that interior tiles can be replaced while the switch is operating for hot swap repair.

2.11 "Multi-layer Switching Network" Flexible Cables, or Ribbon Cables

Connections between tiles, made from relatively inexpensive flexible cables, also known as ribbon cables, carry low-voltage differential signals (LVDS) between base modules within a switch like ribbon cable. "Rigid" ends to the flexible cables present contacts in the form of (i) exposed and (ii) bent wire ends that are pressed against pads upon the tiles by clips. Except for the "top" layer, connections always run from the back of a tile in one panel to the front of a tile in the next panel and always run straight up-and-down or side-to-side. The top layer runs between contacts on the panel furthest from the processors. Packets burrow through switchpoints in tiles away from the processors until the top layer, where they start to burrow back. This avoids the problem of physically connecting to opposite sides the switch; outgoing and incoming channels are adjacent for simple, short connections to processors using the switch.

Advantages of making connections with flexible cable include: impedance matching, multiple layers of conductors, foil shielding to reduce cross-talk, connector-less contact with tiles, low unit cost, small size and flexibility so failed tiles and/or flexible cables can be replaced without disassembly.

2.12 Scaling

The "Multi-layer switching network" packaging of the present invention scales by combining four square switches into a larger square switch with four times the capacity, permitting both unbounded scaling and expansion of already-installed switches. Combining four panels of FIG. 7 into a large panel about 32 inches on a side makes panels for a 1024-port switch. Panels for a 4096-port switch could use 16, 256-port panels and be about 64 inches on a side. A 4096-port switch containing six of these big panels (FIG. 8) would be about 30 inches deep held in a rack with removable, clear, access panels, contain 1536 tiles, 24576 switchpoints, and 50688 flex connections total. The longest flex connection for a 4096-port switch is only 38 inches (half the width plus panel spacing). Larger switches are possible, if desired. Each quadrupling of the number of ports adds another panel (four times larger) and roughly doubles the length of the longest flex.

2.13 Partial Population

An arbitrarily-sized switching network can be built by partially populating the next larger size multi-layer switching network.

2.14 Field Replaceable Units

The flexible cable connections allow expansion like an accordion for access to any field replaceable unit (FRU) for hot swapping. Tiles and flexible cable are FRUs. The panel frames that hold the tiles would not be field replaceable without powering-down the switch.

2.15 Multi-layer Switching Network Geometry

Layered networks have nice topological properties for routing, but projecting its topology into a geometry that scales using existing fabrication techniques is challenging. Previous "single-board-type" geometry permitted fabrication and assembly of a single kind of printed circuit board that could be used repeatedly to build switches of various sizes. Unfortunately, local routing between switchpoints on the same board comes at the expense of longer and jumbled wiring between boards. This limits the size of the switches that can be constructed with conventional printed circuit cards plugged into a passive backplane with edge connectors. Nonetheless to these limitations, such conventional technology is useful in air-cooled commercial switches with 8 to 64 SCI ringlets.

In contrast, the multi-layer switching network geometry of the present invention utilizes features available in the latest multi-chip module technology. Principal features of the present invention that permit of its beneficial use in the multi-layer switching network geometry are: many dice are packed in a compact volume; heat is readily conducted from the dice to the MFM edges; direct, high-density interconnection (HDI) directly to bonding pads on the dice is readily realized; and most importantly, routing may readily be made from each die to connections on both faces of the tile.

Another technology feature of the tiles permits making HDI connections between pre-made tiles. The multi-layer switching network geometry originally envisioned used sheets of HDI over planes of identical tiles. Unfortunately, the lithographic processes that draw the tiny lines for HDI could expose only but a limited area while retaining high resolution. Sheets of HDI may be supplanted by ribbons of flexible cable for scalability beyond present day requirements. Military and satellite systems may use HDI sheets to implement "multi-layer switching network" geometry when weight and volume are paramount, and when hot swap capability is useless.

Those attempting to understand the following explanation of "multi-layer switching network" geometry may find it helpful to imagine two-dimensional sheets of HDI connecting switchpoints in tiles, later replacing the sheets of HDI (mentally) with three-dimensional ribbons of flex.

2.16 Layered Network Topology

In layered networks of the type described in U.S. Pat. No. 4,333,468, a switch can route a signal to another switch in the next stage that has the same switch number except for a single binary digit. A "request" (packet) contains a binary number identifying the desired response port. The switch compares the request's destination with bits in its own switch number, and if the bits compared are the same, the request is routed to a straight interconnection path between the switchpoints. Otherwise, the request is routed to another switch through one of the "diagonal" connecting paths. This reduces the Hamming distance (the number of bits that differ) between a packet's destination address and the row number of the switchpoint it currently occupies by one. At the end of the network, should the request reach the switching output stage and the switch number exactly match the request, the Hamming distance will be zero.

The connections between the output terminals of one column of switches and the input terminals of the next column of switches are interconnected in accordance with selected row address routing bits. The algorithm for implementing an embodiment of a Layered network depends upon the input and output terminals that are associated with each of the switches and the numbered switches in a selected algorithm base.

Figure 3:
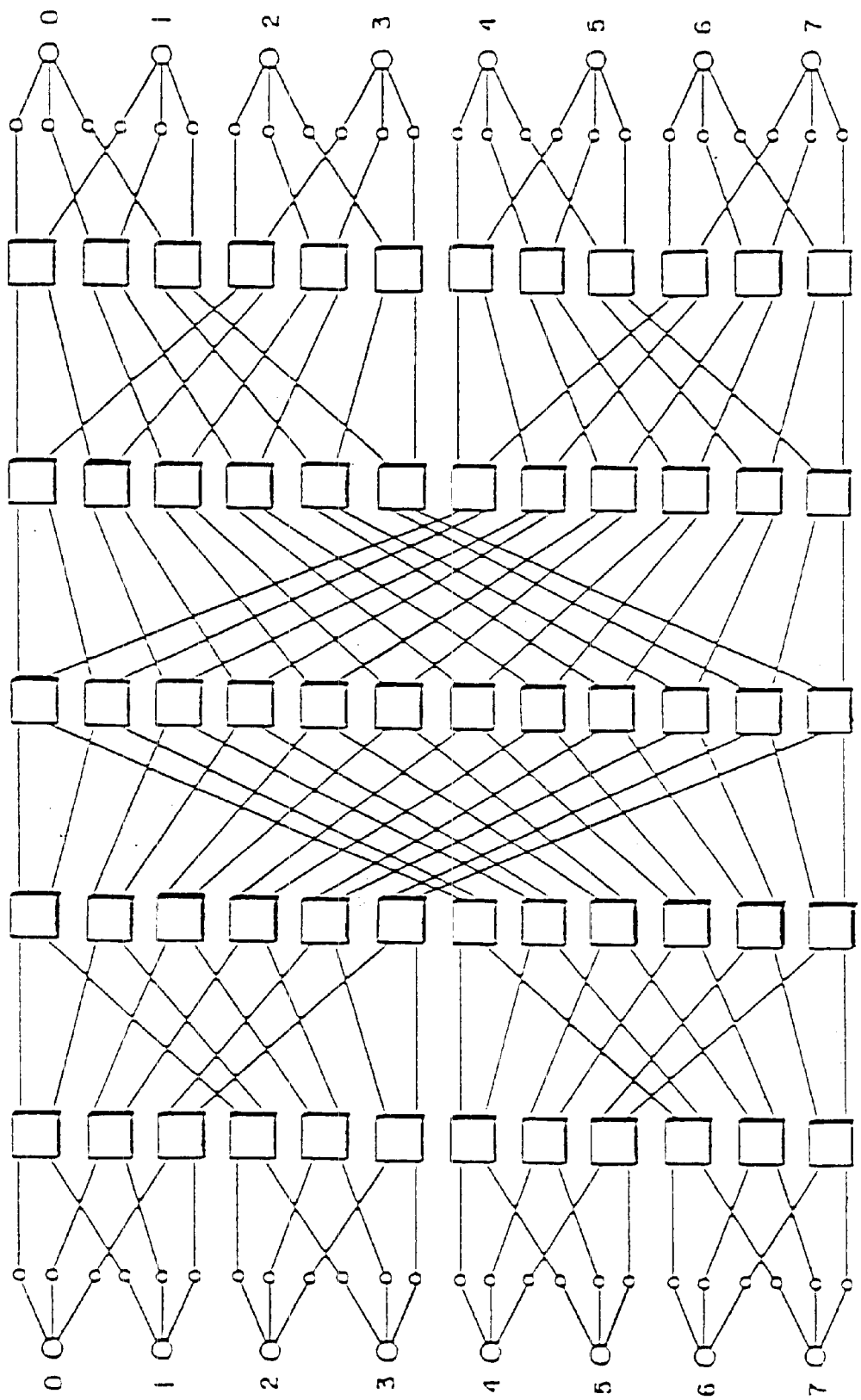
FIG. 3 is a block diagram of a prior art Cantor network.

The particular Layered network of FIG. 3 is a two-plane layered network and has thirty-two rows and two planes. This means that the interconnection wires throughout the network from the output terminals of the switches of column 0 to the input terminals of the switches of column 5 have two straight paths and two diagonal paths for each of the switches of the network.

2.17 Rotate Columns

Figure 5:
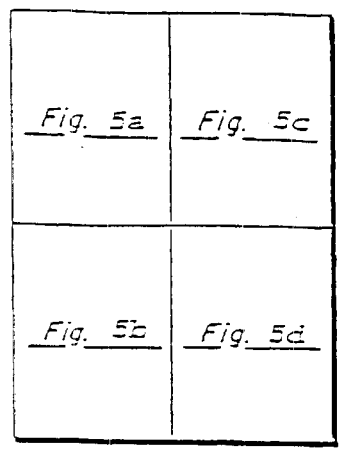
FIG. 5 is a layout that shows how

FIG. 3 shows that the longest wires in the layered network embodiment occur between the switches of columns 0 and 1 and between those of columns 1 and 2. A preferred, but optional, first step in implementing the present invention in networks, such as the one in FIG. 3 in which the longest interconnecting wires are not found in the middle of the network, is to "rotate" the columns of the network, as illustrated in FIG. 5, so that the longest connections are relocated in the middle of the network. FIG. 5 shows how this is accomplished for the network of FIG. 3.

FIG. 5 shows a rotated 32-row layered network. After rotation it is seen that the interconnection pattern that existed in FIG. 3 between columns 4 and 5 now appears between those of columns 0 and 1 in FIG. 5. The interconnection between the outputs of the switches of column 1 and the inputs of the switches of column 2 is then identical to the interconnection pattern between the column of switches 0 of the column of switches 1 in FIG. 3. Thus, all of the interconnection patterns are moved to the right so that the interconnection pattern of FIG. 3 between the switches of columns 1 and 2 with the longest interconnection paths is placed between the switches of columns 2 and 3 in the middle of the network of FIG. 5.

2.18 Connections Between Switchpoints

Which row address routing bits are used to determine the wiring pattern between the switches of the Layered network of FIG. 5 are shown below the wires and between the columns of the switches, for example, between columns 1 and 2 row routing address bits 4,0 are used. The order is significant. The routing algorithm prefers to use the path to the switchpoint in the next column whose row number differs by the bit indicated by the second digit. This is called "last chance" routing, because if a packet needs to take a diagonal path to toggle a bit, this is the last chance to do it. The order the bits are handled are irrelevant so long as they are handled in successive columns. Multi-layer switching network takes advantage of this freedom to facilitate scaling. When four smaller networks are combined into a larger one, the extra columns of switches and wiring are effectively inserted into the middle of the network so that the two new address bits (most significant) are routed in successive stages.

In the network of FIG. 5, each switch has four outputs and four inputs. But the current implementation of switchpoints neglects one of the straight paths to conserve package and board pins. The single, straight path is connected between switches in adjacent columns. The row routing address specifies diagonal path interconnects. The diagonal paths are determined by complementing a particular bit in the row number of the originating switch to find the row number of the destination switch.

For example, wiring the diagonal path from the switch in row 0, column 0 (upper left-hand switch in FIG. 5) to the switch in row 2, column 1 is determined by complementing bit 1 of the originating switches row. (Binary, non-negative integers number their bits from right to left starting with zero.)

$$00000_2 => \text{complement bit } 1 => 00010_2$$

Wiring the other diagonal path is determined by complementing bit 0 to connect to the switch in row 1, column 1. Similarly, the switch in row 7, column 3 is connected to the switch in row 7 (single-straight path), row 3 (bit 2 complemented), and row 15 (bit 3 complemented). Switches are numbered in hexadecimal for ease of conversion to binary.

2.19 Folding

The interconnection pattern of FIG. 5 should now be conceptually "folded" at the middle of the network along the dotted line between the columns of switches 2 and 3. Conceptually performing this operation makes two overlapping planes of switches. The switches of columns 0–2 may be thought of as forming an upper plane and those of columns 3–5 as forming a lower plane, and when finally fabricated interconnections will be made around switches in overlapping columns after folding. Switches to the left of the dotted line before folding are then representative of switches on the upper layer that send requests "away" from the processors connected to the left-hand, input side, and switches to the right of the dotted fold line then represent switches on the lower level that send requests "back" towards processors connected to the right-hand, output side of the structure. In other words, all of the switches of columns 0–2 to the left of the dotted line will lie in one layer directly over the switches of columns 3–5 to the right of the dotted line.

Folding does two things: it solves the end-around problem, and it puts the longest wires on the net "top." The end-around problem is endemic to multistage interconnection networks. Usually a processor needs to connect to both sides of the network, as is certainly the case with emulation of the unidirectional ring protocol SCI uses. If the processors are plugged into one side of the network, then 4096 channels emerging from the opposite side need to loop the end around in a most inelegant manner. In Multi-layer switching network geometry, packets traverse half the network "away" from the processors, and the other half "back." This is why two columns of switchpoints reside on the same tile and why four different routing grids are needed for flex connections between panels. Routing grids can route North/South, (N/S), or East/West (E/W) wires between switchpoints whose row numbers differ by a single bit, independently of whatever direction a bit is wired in the other routing grids. Two columns of wiring route two address bits each, using four routing grids.

2.20 Squaring

After folding, the switchpoints are laid out in a square such that every switchpoint whose row number differs by a single bit lie straight North, South, East, or West. The eight dual-switchpoints on each tile are arranged in a 2×4 rectangle so that given numbers as shown in FIG. 6, they obey this property.

FIG. 6 shows the row numbers of dual-switchpoint dice embedded in a tile, while FIG. 7 shows the flex connections on the front of tile.

FIG. 7 shows contacts on the surface of the tile to which flex connections are attached with clips. FIG. 9, consisting of FIGS. 9a through 9c, shows the wiring between tiles in the first and second panels. All the flex ribbons between the first and second panels (no matter how large a network is constructed) connect between tiles that are directly across from each other. After folding, bits 1,0 away and 2,1 back are wired between the first two panels. Wiring goes to contacts labeled a0,a1 and b0,b1 for paths going away and back respectively. Therefore red ribbons connect a0 contacts between switchpoints whose row numbers differ by just bit 1. Orange ribbons connect a1 contacts between switchpoints whose row numbers differ by bit 0. Yellow ribbons connect b0 contacts for bit 2 and finally green ribbons connect 1 contacts. Which bits are routed at which stage of the network determines the connections made by each color.

Each time four smaller networks are combined into a larger network, there will be four times as many rows which require two additional bits to number. Pairs of bits are related according to the pattern in FIG. 8. FIG. 8 shows the switchpoint row addresses for four tiles, 32-rows.

Expanding by four again, a network with 128-rows, and two more bits for row numbers is shown in FIG. 9. Switch number 29 ($0011101_2$) is highlighted in FIG. 9. Tiles are shown without the panel frame that holds them. (FIG. 9 shows switchpoint numbering in 16-tile panels.)

2.21 Panels

FIG. 7 shows a 16-tile panel. The panel frame is planned to be plumbed for coolant to extract heat from the edges of the tiles. Panels also supply power and ground to the tiles. JTAG maintenance channels may also be placed on panel frames. Larger panels would be made from squares of smaller panels.

2.22 Putting It All Together

FIG. 10 shows a 128-row, 256-ringlet switch made for four panels, each containing 16 tiles. Larger panels can be made by successively combining four smaller square panels.

3. Use of the Switching Network

3.1 Variable Packet Size

Variable packet size is a feature that promotes efficient use of the links between SCI nodes. Packets containing data payloads can be as long as necessary, within the defined packet sizes, while handshaking packets such as echoes can be very short. However, packets should arrive simultaneously at switchpoints in order to allow optimum routing decisions and thereby minimize recirculation. To do this, the second-generation switch aligns packets so that they begin routing together as a "wave". The wave mechanism melds variable size with routing efficiency. Simulations show that the slight delay imposed to align packets is more than made up by improved routing efficiency.

3.2 Global Addressing

Global addressing for shared memory is a fundamental feature of SCI. Architectural limits of SCI are 65520 nodes, each with 280 TeraBytes of globally-accessible memory—room for growth even beyond the immediate future requirements.

3.4 Cache Coherence

SCI defines a cache coherence protocol may be supported by the switch of the present invention. SCI's cache coherence protocol is transparent to our switch, since cache coherence is implemented with SCI packets that the switch routes like all other packets. Processors that need cache coherent operations may use either hardware or software to implement necessary functions.

3.5 Reliability, Availability, Serviceability

Reliability, availability, and serviceability (RAS) determine if a large system can be effectively employed, because the large number of parts statistically increases chances of parts failures. Treatment of fault incidents requires a global view of the switch condition (in contrast to the local view switchpoints have of packets). To provide that switch wide view, a maintenance controller is included in the switch. Its purpose is to provide intellectually manageable access to the myriad internal details of the switch, operational state and performance data, error reports, and to interpret commands to control the switch's configuration and behavior.

In the event of a switchpoint or link failure, the maintenance processor is planned to detect it as a part of its normal monitoring activities. If previously authorized by the system administrator, the maintenance processor immediately reconfigures the switch to avoid the failed part, and repair support is determined. A LED on the replaceable unit is activated to help the service person easily identify and replace it. In this fashion, mean time to repair can be minimized, and system operation can continue during the repair process. Response to an external failure, where a processing node or switch logic directly attached to it fails, is similar except that the failed part will clearly cause loss of its associated node. The rest of the system can continue to operate.

There is provision for dual maintenance processors, so that a maintenance processor failure need not sever access to the switch. The two processors communicate with each other using heartbeat signals to determine which one is active at any time.

3.6 Error Detection

Switchpoints detect a variety of errors that indicate parts failures. Parity of idle symbols and cyclic redundancy check symbols in packets provide cross checks of valid symbols at all times; these errors are detected, counted by the switchpoint, and picked up by the polling maintenance processor within a millisecond or so. The maintenance processor can also inspect the immediately connected switchpoints to determine the location of the failure. Permanent and intermittent failures are detectable and distinguishable by this approach.

3.7 Reconfiguration

Upon detection of internal faults, the maintenance processor can often reconfigure the switching network to avoid failed components without diminishing connectively. While there is no functional loss in this case, there will be a slight increase in contention because of the reduced routing choices. When the failures are so severe or are located such that complete connectivity cannot be maintained, the maintenance processor reconfigures the operational portions of the system for maximal connectivity. System software is notified to reconfigure to use only operational, connected portions of the system.

3.8 Partitioning

The switching network may be partitioned by the system administrator to allow the system (of which it is a part) to operate as multiple smaller systems. Partitions are functionally independent; no packets in one partition will enter any other. Any packets destined for ringlets outside of the partition are detected and scrubbed in the same manner as mis-addressed packets in the single system reconfiguration.

3.9 Hot Swap Repair

All field replaceable units within the switching network may be replaced without damage while system power is on. Usually the failed unit will be reconfigured by the switch or the system administrator away from portions of the system continuing to operate. If an operational card is arbitrarily removed, the maintenance processor will attempt to reconfigure around it without disrupting the system.

3.10 Reintegration of Partitions or Repaired Modules

A partitioned switch or one that has been repaired can be reintegrated with minimal disturbance to ongoing computations. The integration process stops all switch activity for long enough (a few microseconds) to assure that all protocol states in the separate subsystems are in agreement, and then resumes activity. The system administrator can thereby recombine separately operating partitions, or allow repaired portions to be used again.

3.11 System Software

System software is required either for switch control, or services provided by the nodes attached to the switch. Primary access to the switch other than for operation is expressed in SNMP (simple network management protocol) so that it can be consistent with maintenance activities for other devices and networks. For those connections intended for message passing protocols, the node supplier typically provides drivers for each operating system involved. These drivers are written for ring connections, but insertion of the switch is transparent to the protocol.

3.12 Switch Control

Switch control, performed by the maintenance controller of the switching network, includes polling switchpoints for error, status, and performance information, calculating switchpoint parameters, avoiding failed switchpoints for graceful degradation, and partitioning the switch. Switch control software for the multi-layer switching network switch will be written as an extensions to existing software for commercial switches.

3.13 Node SCI Drivers (LC-2 control)

Each node connected to the switching network for message passing operations controls its own SCI link controller with a device driver. Nodes utilizing the switch to shared memory may need modification to their memory allocation software to make global memory accessible, but no driver is used during application execution.

3.14 Resource Management

Management of network resources is performed automatically by the switching network. Management of node resources is node dependent; each node must make the switch accessible to applications either through the communications software or the memory management software.

3.15 Health and Performance Monitoring

The maintenance processor of the switching network collects fault and performance data automatically captured by switchpoints and places it in the SNMP management information base (MIB). It is accessible there from the site administration station. The software effort here is extending the commercial MIB to accommodate large switch sizes.

3.16 Switching Network Debugging

The maintenance processor collects data and controls switchpoint parameters to facilitate network debugging beyond indicating which FRUs have failed and need replacement. However, it should also be noted that the switch protocol is at a lower level than is a traditional local area network, and the switch has a uniform internal topology. This means that many typical network debugging situations such as deadlock, circular routes, overflowing queues, lost packets, duplicated packets, etc. cannot occur.

3.17 Application Debugging

The switching network is transparent to operations at the application level. Even though the application may explicitly perform operations such as push and pull, the switch only sees the memory operations associated with the data transfers. Thus the switching network does not have visibility into possible deadlock, livelock, etc. that an application may bring upon itself. The role of the switching network in these matters is best compared to a memory bus—too low level to recognize a bug. At the same time, if a bug situation can be recognized by other means, the switch's performance data and history buffers may help to capture the needed debug information.

3.18 Packetization and Virtual Circuits

Packetization (as usually thought of) and virtual circuits are unnecessary with the switching network of the present invention because it performs shared memory operations. Packetization may be necessary when messages are passed through our switch, because maximum packet sizes are fixed. Every packet contains complete routing information, so virtual circuits are not necessary.

3.19 Software Fault-Tolerance

Although the switching network detects and scrubs packets destined for a failed or unreachable node during degraded or partitioned operation, achieving software fault tolerance requires redundant checkpoints, rollback, and address translation modification, which are beyond the scope of this effort. Notification of failures is available from the nodes interface and from the switch to initiate such activities.

3.20 Switching Network Partitioning and Reconfiguration

At the direction of the system administrator, the switching network may be partitioned into functionally distinct sub-switches, and later re-integrated by the maintenance controller. The maintenance controller will use a "Hamming partition" if possible because such partitions have the same routing power as an undamaged switch of that size. Subsequent faults may cause further reconfiguration.

4. Practical Production of the Multi-Layer Switching Network

Despite its potentially considerable size, and high performance, the multi-layer switching network in accordance with the present invention is eminently (i) presently producible, and (ii) readily augmented with future technology.

4.1 Packaging

The packaging technology—described in a related patent application—for large switches in a Scaleable Computer Interconnect ("SCI") multi-layer switching network was developed in parallel with the physical implementation of a multi-layer switching network of the present invention. The physical implementation of network in (i) panels containing switchpoint dice and (ii) flat circuits between panels, requires the packaging technology. The packaging technology enables the physical Scaleable Computer Interconnect ("SCI") multi-layer switching network.

The advanced technical capabilities of the multi-layer switching network are of the present invention are demonstrable using commercially available, commodity, hardware and software. The bandwidth of the commercial switchpoints used to construct the fabric of the switching network will, however, be increased, in the future in order to meet TeraFLOP network performance requirements. This will occur by migrating the switchpoint design to faster semiconductor processes as such processes become available.

The switch protocol, illustrating switch hardware compatibility with message-passing protocols, is already demonstrable. Each port of a 16-port, commercially-available switch provides raw bandwidth of 0.5 GigaBytes/second. Subsequently, the switchpoint is planned to be upgraded from LSI Logic's G-10 CMOS process to operate at 1 Gigabyte/second per port when a process for fabricating faster semiconductors becomes available.

Still further development will integrate a 0.5 to 1.0 gigaByte/second per port switchpoint developed by the assignee of the present invention with a processor configuration supplied by Data General Corporation. This demonstration will illustrate compatibility of the switching network with commercially available, cache coherent, shared memory, Non-Uniform Memory Access (NUMA) architectures.

Finally, assignee of the present invention Lockheed Martin and its commercial partners plan to demonstrate a large, multi-layer switching network switch having 256 ringlets and using a second-generation dual-switchpoint currently being developed. The tiles of this multi-layer switching network can subsequently be upgraded when still faster switchpoints are fabricated.

4.2 Shared Memory

A cache-coherent, shared-memory model, that allows direct memory access among processing nodes is easier to program, and is inherently faster than message passing. However, there are distinguished computer scientists that will take issue with this point. Fortunately, the switch of the present invention proposed here is indifferent to the discussion—it will support both message passing and shared memory use, even simultaneously. Current usage and perceptions need not limit migration to shared memory, if and when it becomes generally accepted.

Arguments for easier programming of shared-memory systems can get esoteric, but they include (i) the availability of more methods of task synchronization than just the passing of messages, and (ii) the ability to express parallel algorithms more abstractly, that is, with less concern about physical locations of programs and data. Message passing architectures demand partitioning of the data as well as the algorithm. Knowing in which processor needed data resides and gathering it into the processor that needs it incurs software overhead. Shared-memory systems provide a global address space in which to access data directly, without needing the know which processor(s) produced the input data or which processor(s) will need the output data. Furthermore only the data actually needed is accessed rather the moving all the data that might be needed via messages. By eliminating the need to explicitly partition and move data, shared memory systems waste less bandwidth and permit algorithms whose structure is not data location dependent. System behavior issues such as deadlock, livelock and load balancing are less severe or nonexistence in shared-memory system. Deadlock and livelock exposure can often be avoided by utilizing the appropriate synchronization primitives for the situation at hand, while load balancing can occur implicitly when the processors communicate via shared memory.

4.3 Low Latency and High Bandwidth

Low latency is more important than high bandwidth because processors often stall waiting for remote references. Lost latency is impossible to recover, while parallel and pipeline methods can restore bandwidth. Recognizing this, the (multi-layer) switching network of the present invention is designed to have minimum latency. This is accomplished by using the "global addresses" of the Scaleable Computer Interconnect ("SCI") protocol directly to make fast, local routing decisions. Local routing decisions are essential for scalability.

In contrast, those who strive for high bandwidth over long distances devise complex protocols, support very large packets and use look-up tables for routing decisions—making latency problematic. This is not to say that bandwidth is unimportant, rather than when low latency is the goal, high bandwidth comes free, but when high bandwidth is the goal, latency is sacrificed.

4.4 Commercial Off the Shelf (COTS) Technology

The IEEE standard SCI protocol permits use of commercial off-the-shelf (COTS) components with their low cost and their high potential for rapid technology improvement. The high-density packaging of the switching network of the present invention will itself facilitate deployment of powerful parallel processors in military and other, (i.e., non-military), platforms early next century.

4.5 Fault Tolerance and Graceful Degradation

Due to the large number of components in—by way of example of the type of systems in which the switching networks of the present and related inventions are most commonly used—30+TeraFLOP/s systems, failed components will be relatively frequent, so fault tolerance and graceful degradation must allow computation despite failed components.

From the very beginning, development of the interconnection switching network of the present invention stressed error detection and reconfiguration. The switching network topology itself provides extra paths that reduce network contention when fully operational, but allow reconfiguration upon permanent faults with little or no reduction in connectivity. The physical structure, and packaging, promotes repair, and efficient effective repair. The error detection and graceful degradation mechanisms devised for hard-to-service systems such as satellites will enhance availability in both military and commercial installations.

4.6 Hot Swap

Replacement of failed field replaceable units (FRU) while the system is running (hot swap) combined with graceful degradation and re-integration mechanisms can approach 100% system availability. Hot swap capability is totally compatible with the switching network of the present invention.

4.7 Use of the SCI-Compliant Switching Network of the Present Invention with Commercial Products By substituting the SCI-compliant multi-layer switching network of the present invention for conventional ring networks, users will be able to both reduce latency and increase aggregate bandwidth of the inner-processor communication. This substitution requires little or no modification in application and system software developed to use SCI rings. However, maintenance portions of system software and switch control software running on the maintenance controller(s) dedicated to the switch will need integration.

5. Summary

The optimized layers network topology of the related invention, combined with the SCI protocol and with the multi-layer layer switching network packaging geometry of the present invention, present an attractive approach to communication among a large number of processors, providing all requisite bandwidth, latency, and scaling characteristics. Issues of routing, fault handling and internal switch contention are managed routinely by switch hardware. The switching network operates smoothly in the face of hot spots, in contrast to networks that use queuing to resolve contention, and can guarantee delivery of all packets.

5.1 Feasibility

The present invention provides a reasonable path to upgrade switching network technology from a current value of about 500 MegaBytes/s per port to 1 GigaByte/sec per port, using primarily a commercial semiconductor process upgrade. The high bandwidth of the SCI standard and low-latency of the switching network has aroused much commercial interest. The packaging technology for a 64 port switch (at either speed) is also readily available.

Packaging technology for large switches is less developed. The conventional, printed circuit board technology used for smaller switches becomes unwieldy beyond 128 ports or so. The multi-layer switching network packaging approach of the present invention provides attractive scaling capability that scales indefinitely. The cost of the advanced packaging and wiring technology unnecessary for the multi-layer switching network packaging is expected to decrease with experience and production volume.

5.2 Applicability

The larger versions of switching networks in accordance with the present invention, utilizing the SCI protocol and the multi-layer switching network packaging geometry, will provide the scalable, low-latency, high-bandwidth, shared-memory access required into the next century.

5.3 Affordability

The scalability of the switching network of the present invention is one measure of its affordability. Its active logic scales with $O(N \log_2 N)$, which is the theoretical minimum for a switch with equal latency to all destinations. The number of switchpoints, and the number of interconnection wires both scale at this rate. The length of the interconnection wires scales with the square root of N, which is the minimum for a switch organized as a two-dimensional array.

The other measure of affordability is the cost of components. Switchpoints and tiles will be more expensive than typical commercially packaged components, because, to minimize flex length and speed-of-light delays, it is worthwhile to minimize the space they consume. Although the flex ribbons individually are simple and cheap, thousands are used and assembly may be problematic. During the course of the proposed effort, costs associated with tiles and flex are expected to decrease substantially.

The cost of the switching network will not desirably become dominant over the cost of the processors connected to the switch. This may be seen by associating a row of switchpoints with each pair of ports, and comparing the half-dozen parts in that row with the number of parts (for example, the components of the 4 (GByte memory) in the nodes attached to chat pair of ports.

In accordance with the preceding explanation, variations and adaptations of the multi-layer switching network in accordance with the present invention will suggest themselves to a practitioner of the digital communication arts.

In accordance with these and other possible variations and adaptations of the present invention, the scope of the invention should be determined in accordance with the following claims, only, and not solely in accordance with that embodiment within which the invention has been taught.

What is claimed is:

1. A multi-stage switching network for electrically communicatively interconnecting a multiplicity of electrically communicating devices, the network comprising:
   (a) a plurality N1 of planar panels spaced parallel from a bottom layer physically closest to the devices to a top layer furthest from the devices, each panel mounting
      (a1) a plurality N2 of multi-chip modules known as tiles, each tile having
         (a1a) a plurality N3 of switchpoints each realized as
            (a1a1) a plurality N4 of dice, having pads and held to the tiles, for switching received electrical signals,
            (a1a2) electrically conductive vias through the tiles, and
            (a1a3) a plurality N5 of electrically conductive pads upon both sides of the tiles, and
            (a1a4) wiring layers upon the tile electrically connecting the dice pads, the vias, and the electrically conductive pads,
   wherein the electrically-connectable pads are presented upon both sides of the tiles, and thus both sides of the panels in which the tiles are mounted; and
   (b) flexible substantially-planar multi-conductor cables, located between adjacent panels and electrically connecting the pads on one panel to the pads of a facing surface of an adjacent panel, the cables existing in their extension between the panels substantially in two orthogonal planes each of which planes is orthogonal to the planes of the panels, the cables making a plurality N6 of flex connections total.

2. The multi-stage switching network according to claim 1 wherein the plurality of planar panels comprise:
   channels within which coolant flows for removal of heat developed in the dice of the switchpoints of the tiles that are mounted to the panels.

3. The multi-stage switching network according to claim 1 wherein the dice consume power, and wherein the plurality of planar panels comprise:
   power and ground connections to the tiles on which reside the switchpoints including the dice.

4. The multi-stage switching network according to claim 1
   wherein each of the plurality of multi-chip modules known as tiles has and defines recesses in which are located the plurality of dice of the plurality of switchpoints so that one surface of the dice is substantially even with a surface of the tile;
and wherein the wiring layers upon the tile comprise:
   printed circuit traces substantially in a plane.

5. The multi-stage switching network according to claim 1 wherein the flexible substantially planar multi-conductor cable comprises:
   ribbon cable with stripped wire ends bent ninety degrees so that these wire ends may lie flush against the pads of the panels.

6. The multi-stage switching network according to claim 5 wherein the ribbon cable is treated at its stripped ends so as to become rigid.

7. The multi-stage switching network according to claim 1 further comprising:
   connectors for forcibly pressuring the stripped wire ends of flexible printed circuit cables against the pads of the panels so as to make electrical connection thereto.

8. The multi-stage switching network according to claim 1 wherein the on the pads on the panels are in a pattern that is identical upon both sides of the panels.

9. The multi-stage switching network according to claim 1 (i) built with switchpoints that are 3×3, meaning that three signals in are selectively controllably routed to three signals out.

10. The multi-stage switching network according to claim 9 configured for communicatively interconnecting 256 devices
    wherein the plurality N1 of planar panels numbers 4;
    wherein the plurality N2 of multi-chip modules, called tiles, numbers 16 each panel, for a network total of 4×16=64;
    wherein the plurality N3 of 3×3 switchpoints numbers 16 each tile, for a network total of 16×64=1024;
    wherein plurality N4 of dice numbers ½ each switchpoint, making that each die is a dual switchpoint, for a network total of ½×1024=516 dice;
    wherein the plurality N5 of electrically conductive pads numbers 16, or the same as the number of switchpoints, upon each of two sides of the tiles; and
    wherein the plurality N6 of flex connections numbers 4 each dual-switchpoint die, or 516×4=2064 in total.

11. The 256-device communicatively interconnecting multi-stage switching network according to claim 10
    wherein there is an additional, direct, electrical connection via a multi-conductor cable between each tile and a facing tile upon an adjacent panel;
    wherein the plurality of N6 of flex connections increases to 2064+64=2128 in total.

12. The multi-stage switching network according to claim 9 configured for communicatively interconnecting 1024 devices
    wherein the plurality N1 of planar panels numbers 4;
    wherein the plurality N2 of multi-chip modules, called tiles, numbers 16 each panel, for a network total of 4×16=64;
    wherein the plurality N3 of 3×3 switchpoints numbers 16 each tile, for a network total of 16×64=1024;
    wherein plurality N4 of dice numbers ½ each switchpoint, making that each die is a dual switchpoint, for a network total of ½×1024=516 dice;
    wherein the plurality N5 of electrically conductive pads numbers 16, or the same as the number of switchpoints, upon each of two sides of the tiles; and
    wherein the plurality N6 of flex connections numbers 4 each dual-switchpoint die, or 516×4=2064 in total.

13. The 256-device communicatively interconnecting multi-stage switching network according to claim 12
    wherein there is an additional, direct, electrical connection via a multi-conductor cable between each tile and a facing tile upon an adjacent panel;

wherein the plurality N6 of flex connections increases to 2064+64=2128 in total.

14. The multi-stage switching network according to claim 9 configured for communicatively interconnecting 4096 devices
wherein the plurality N1 of planar panels numbers 6;
wherein the plurality N2 of multi-chip modules, called tiles, numbers 256 each panel, for a network total of 6×256=1536;
wherein the plurality N3 of 3×3 switchpoints numbers 16 each tile, for a network total of 1536×16=24576;
wherein the plurality N4 of dice numbers ½ each switchpoint, making that each die is a dual switchpoint, for a network total of ½×24576=12288 dice;
wherein the plurality N5 of electrically conductive pads numbers 16, or the same as the number of switchpoints, upon each of two sides of the tiles; and
wherein the plurality N6 of flex connections numbers 4 each dual-switchpoint die, or 12288×4=49152 in total.

15. A 4096-device communicatively interconnecting multi-stage switching network according to claim 14
wherein there is an additional, direct, electrical connection via a multi-conductor cable between each tile and a facing tile upon an adjacent panel;
wherein the plurality N6 of flex connections numbers increases to 49152+1536=50688 in total.

16. The multi-stage switching network according to claim 14
wherein each of the plurality of panels is 64 inches or less on each side;
wherein the spacing between adjacent panels is four inches or less; and
wherein a longest flex connection between any two adjacent panels made by any of the flexible substantially-planar multi-conductor cables is no more than 38 inches, or one half a panel's maximum 64 inch dimension plus the 4 inch distance between adjacent panels.

17. The multi-stage switching network according to claim 1
wherein the switchpoints are self-routing, meaning that the connection of electrical signals from switchpoint input to switchpoint output is determined by data received at the switchpoint input.

18. A multi-stage switching network that serves to physically implement a logical network of a particular design configuration, the logical design configuration network having
a plurality of switches logically arranged into an even numbered plurality of two or more rows, and
a plurality of switches logically arranged into an even numbered plurality of four or more columns,
where logical interconnection paths between the switches of one column and the switches of the adjacent columns have been predetermined by
(1) conceptually rotating the plural columns of switches and interconnection paths between switches of so as to position two adjacent columns with the longest interconnection paths between them to be a center-most pair of columns of switches, and
(2) conceptually folding the plural rotated columns of switches on a line between the two adjacent center-most columns of switches so as to form upper and lower overlapping levels of switches, wherein each column of switches on an upper level overlies a column of switches on a lower level,
the multi-stage switching network that serves to physically implement the particular logical design configuration network that has been both (1) rotated and (2) folded comprising:
a plurality of dice mounted in ranks and files upon each of a plurality of tiles that are in turn mounted in sectors upon each one of a plurality of spaced-parallel panels, an assignment of the logical switches by row and by column to the physical dice by rank and by file, by tile and by panel proceeding stepwise by
(1) arranging switches of each pair of columns of the logical design configuration network into an associated single physical panel so that pairs of switches whose logical row numbers differ by a single bit are assigned a physical rank number corresponding to a logical row number,
(2) wiring all interconnection paths between said switches on all of said panels, except for those between said center-most pair of tiles, with wiring that completes interconnections between overlapping ones of said panels by following paths that extend between said panels according to said predefined network topology definition, and
(3) wiring said longest interconnection paths between said switches in said center-most tiles which reside in said panel that contains both of said center-most pair of tiles of said switches by wiring that completes interconnections between said switches of said center-most pair of tiles of said switches in a single plane according to said predefined network topology definition; and
flexible substantially-planar multi-conductor cables, located between adjacent panels, for electrically connecting the dice that are within the tiles of one panel to the dice that are within the tiles of a facing surface of an adjacent spaced-parallel panel.

19. The multi-stage switching network according to claim 18 wherein each of the plurality of spaced-parallel panels comprise:
a box-like body having a parallelogram cross-section.

20. A method of configuring and constructing a multi-stage switching network for electrically communicatively interconnecting a multiplicity of electrically communicating devices, the method comprising:
locating spaced-parallel a plurality of planar panels from a bottom layer physically closest to the devices to a top layer further from the devices;
mounting to each panel a plurality of multi-chip modules known as tiles;
locating within each tile a plurality of logic switchpoints each of which is physically realized as (1) a plurality of dice, having pads and held to the tiles, for switching received electrical signals, (2) electrically conductive vias through the tiles, (3) a plurality of electrically conductive pads upon both sides of the tiles, and (4) wiring layers upon the tile electrically connecting the dice pads, the vias, and the electrically conductive pads;
wherein electrically-connectable pads are presented upon both sides of the tiles, and thus both sides of the panels in which the tiles are mounted; and
electrically connecting the pads on one panel to the pads of a facing surface of an adjacent spaced-parallel panel by substantially-planar multi-conductor flat circuits located between the panels and aligned in their extension between the panels in two orthogonal planes each of which planes is orthogonal to the planes of the panels.

21. The method of configuring and constructing a multi-stage switching network according to claim 20 further comprising:

locating channels within the panels through which channels coolant flows to remove heat developed in the dice of the switchpoints of the tiles that are mounted to the panels.

22. The method of configuring and constructing a multi-stage switching network according to claim 20 further comprising:

locating upon the plurality of planar panels power and ground connections to the tiles on which reside the switchpoints including the dice.

23. The method of configuring and constructing a multi-stage switching network according to claim 20 further comprising:

wherein the locating within each tile of the plurality of logic switchpoints physically realized as (1) a plurality of dice serves to place the dice into recesses within the tile so that one surface of the dice is substantially even with a surface of the tile; and and wherein the locating within each tile of the plurality of logic switchpoints further physically realized as (4) wiring layers upon the tile electrically connecting the dice pads, the vias, and the electrically conductive pads serves to locate these wiring layers substantially in a plane.

24. The method of configuring and constructing a multi-stage switching network according to claim 20 wherein the electrically connecting of the pads on one panel to the pads of a facing surface of an adjacent spaced-parallel panel transpires by use of substantially-planar multi-conductor flat circuits in the form of ribbon cable.

25. The method of configuring and constructing a multi-stage switching network according to claim 24 wherein the electrically connecting by use of flat circuits in the form of ribbon cable further comprises:

stripping the wire ends of the ribbon cable, and bending the wire ends so stripped ninety degrees, so that these wire ends may lie flush against the pads of the panels.

26. The method of configuring and constructing a multi-stage switching network according to claim 25 wherein the electrically connecting by use of flat circuits in the form of ribbon cable further comprises:

sherloterizing the ribbon cable at its stripped ends so that it becomes rigid.

27. The method of configuring and constructing a multi-stage switching network according to claim 25 wherein the electrically connecting by use of flat circuits in the form of ribbon cable further comprises:

forcibly pressuring with connectors the stripped wire ends of flexible printed circuit cables against the pads of the panels so as to make electrical connection thereto.

28. The method of configuring and constructing a multi-stage switching network according to claim 20 wherein the electrically connecting by use of flat circuits further comprises:

locating the pads on the panels to which the flat circuits connect in a pattern that is identical upon both sides of the panels.

* * * * *